(12) United States Patent
Takeda et al.

(10) Patent No.: US 9,018,340 B2
(45) Date of Patent: Apr. 28, 2015

(54) COPOLYCARBONATE AND TRANSPARENT MOLDED ARTICLE OBTAINED THEREFROM

(75) Inventors: Tsuyoshi Takeda, Tokyo (JP); Tetsuya Motoyoshi, Tokyo (JP); Hiroshi Okamoto, Tokyo (JP)

(73) Assignee: Teijin Limited, Osaka (JP)

( * ) Notice: Subject to any disclaimer, the term of this patent is extended or adjusted under 35 U.S.C. 154(b) by 0 days.

(21) Appl. No.: 14/112,081

(22) PCT Filed: Apr. 13, 2012

(86) PCT No.: PCT/JP2012/060646
§ 371 (c)(1),
(2), (4) Date: Dec. 18, 2013

(87) PCT Pub. No.: WO2012/144573
PCT Pub. Date: Oct. 26, 2012

(65) Prior Publication Data
US 2014/0128567 A1    May 8, 2014

(30) Foreign Application Priority Data

Apr. 19, 2011  (JP) ................................. 2011-093021

(51) Int. Cl.
| C08G 64/00 | (2006.01) |
| C08G 64/16 | (2006.01) |
| C08G 63/02 | (2006.01) |
| C08G 64/12 | (2006.01) |

(52) U.S. Cl.
CPC ............ *C08G 64/1691* (2013.01); *C08G 64/12* (2013.01); *C08G 64/1608* (2013.01)

(58) Field of Classification Search
USPC ........................................ 528/201, 196, 198
See application file for complete search history.

(56) References Cited

U.S. PATENT DOCUMENTS

| 2006/0149024 A1 | 7/2006 | Ono et al. |
| 2010/0081784 A1 | 4/2010 | Brack et al. |
| 2010/0190953 A1 | 7/2010 | Fuji et al. |
| 2012/0232198 A1 | 9/2012 | Sasaki |

FOREIGN PATENT DOCUMENTS

| EP | 2 143 751 | 1/2010 |
| JP | 2008-24919 | 2/2008 |
| JP | 2009-020963 | 1/2009 |
| JP | 2009-20963 | 1/2009 |
| JP | 2010-37551 | 2/2010 |
| JP | 2011-500925 | 1/2011 |
| JP | 2011-127108 | 6/2011 |
| JP | 2012/41467 | 3/2012 |
| JP | 2012-41467 | 3/2012 |
| WO | 2004/111106 | 12/2004 |
| WO | 2006/041190 | 4/2006 |
| WO | 2009/052463 | 4/2009 |

OTHER PUBLICATIONS

International Preliminary Report on Patentability issued Oct. 31, 2013 in corresponding Application No. PCT/JP2012/060646.
Journal fur praktische Chemie Chemiker-Zeitung, vol. 334, p. 298-3101, 1992 (Abstract in English).
Macromolecules, Hans R. Kricheldorf, Shih-Jieh Sun, and Andreas Gerken, vol. 29, p. 8077-8082.
Journal of Applied Polymer Science, Okada Masahiko, Makito Yokoe, and Keigo Aoi, vol. 86. p. 872-880.
International Search Report issued May 22, 2012 in International (PCT) Application No. PCT/JP2012/060646.

*Primary Examiner* — Terressa Boykin
(74) *Attorney, Agent, or Firm* — Wenderoth, Lind & Ponack, L.L.P.

(57) ABSTRACT

A copolycarbonate that is derived from a renewable resource, is excellent in heat resistance, flowability and transparency, and prevented from undergoing a dimensional change by water absorption and coloring during molding as well as a transparent molded article obtained therefrom. The copolycarbonate contains predetermined amounts of a unit (A) constituted of an ether diol residue represented by the formula (1), a unit (B) constituted of a bisphenol residue represented by the formula (2), and a unit (C) constituted of another diol residue, wherein the ratio of terminal groups falls within the ranges of the expressions (i) and (ii).

11 Claims, 2 Drawing Sheets

COPOLYCARBONATE AND TRANSPARENT MOLDED ARTICLE OBTAINED THEREFROM

TECHNICAL FIELD

The present invention relates to a copolycarbonate derived from a renewable resource and a transparent molded article obtained therefrom. More specifically, it relates to a copolycarbonate which has excellent heat resistance, flowability and transparency and is prevented from undergoing a dimensional change by water absorption and coloring during molding and a transparent molded article obtained therefrom.

BACKGROUND ART

Polycarbonates are generally produced by using raw materials derived from oil resources. However, it has recently been worried about the depletion of oil resources and desired to provide polycarbonates from raw materials obtained from biomass resources such as plants.

Heretofore, studies have been made to obtain polycarbonates through transesterification with diphenyl carbonate by using isosorbide as a plant-derived monomer (for example, Non-patent Document 1, Non-patent Document 2 and Non-patent Document 3). However, since a homopolycarbonate obtained from isosorbide has a rigid structure, its glass transition temperature and melt viscosity are extremely high, thereby making it difficult to mold it. Since the thermal decomposition temperature of the isosorbide skeleton is low, when extrusion and molding are carried out at a temperature of 250° C. or higher, there occur problems such as coloration and the production of a silver streak. Further, as isosorbide has high hygroscopic nature, a polycarbonate polymerized from isosorbide also has high hygroscopic nature, thereby causing a problem such as a dimensional change by water absorption when it is used for application in molded articles.

As studies on the improvement of moldability, attempts have been made to copolymerize isosorbide with an aliphatic diol (Patent Document 1). In Examples of Patent Document 1, ethylene glycol, 1,3-propanediol, 1,4-butanediol, 1,5-pentanediol and 1,6-hexanediol are enumerated as examples of the aliphatic diol as a comonomer. Moldability is greatly improved by introducing the aliphatic diol as a soft structure to provide flowability. However, there is a trade-off relationship between the aliphatic diol and isosorbide, that is, when the amount of the aliphatic diol to be introduced is large, heat resistance degrades whereas when the amount of the aliphatic diol to be introduced is small, the great influence of the isosorbide skeleton appears and water absorption becomes high.

Meanwhile, it has been reported that a polycarbonate having good balance between rigidity and toughness is provided by copolymerizing a bisphenol with isosorbide (Patent Document 2). In Examples of Patent Document 2, bisphenol A is studied as the bisphenol which is a comonomer. This two-component-based polycarbonate which comprises isosorbide and the bisphenol has high melt viscosity like a homopolycarbonate of isosorbide, and an extrusion/molding step at a temperature of 250° C. or higher is required. Therefore, it is difficult to use the above polycarbonate for application in a transparent molded article due to coloration and the production of a silver streak.

Studies have been made on the copolymerization of isosorbide with an alicyclic diol as another comonomer. In Examples, cyclohexane dimethanol and tricyclodecane dimethanol are enumerated as examples of the alicyclic diol. Even when these alicyclic diols are copolymerized, the obtained copolycarbonates are still unsatisfactory because they do not have high heat resistance and low water absorption at the same time like a polycarbonate obtained by copolymerizing an aliphatic diol (Patent Document 3).

Meanwhile, a terpolycarbonate obtained by terpolymerizing 9,9-bis(4-hydroxy-3-methylphenyl)fluorene (biscresol fluorene, BCF), isosorbide and an aliphatic diol or an alicyclic diol has been studied for use in films (Patent Document 4). However, the composition ratio and comonomers of the terpolycarbonate suitable for use in molded articles are not disclosed. Further, an effect obtained by controlling the terminal ratio is not disclosed at all. Although there is no problem when it is used for films, the terpolycarbonate obtained by Patent Document 4 is colored due to BCF. Therefore, it is desired to select comonomers suitable for use in thick transparent molded articles.

(Patent Document 1) WO2004/111106
(Patent Document 2) JP-A 2010-37551
(Patent Document 3) JP-A 2008-24919
(Patent Document 4) WO2006/041190
(Non-patent Document 1) "Journal fuer praktische Chemie" vol. 334, p. 298-3101, 1992
(Non-patent Document 2) "Macromolecules", vol. 29, p. 8077-8082, 1996
(Non-patent Document 3) "Journal of Applied Polymer Science", vol. 86, p. 872-880, 2002

DISCLOSURE OF THE INVENTION

It is an object of the present invention to provide a copolycarbonate derived from a renewable resource and a transparent molded article obtained therefrom. It is another object of the present invention to provide a copolycarbonate which has excellent heat resistance, flowability and transparency and is prevented from undergoing a dimensional change by water absorption, coloring and producing a silver streak during molding.

The inventors of the present invention conducted intensive studies to achieve the above objects and found that the above objects can be attained by copolymerizing a recurring unit constituted of an ether diol residue, a recurring unit constituted of a bisphenol residue and a recurring unit constituted of another diol residue in a specific ratio and providing a specific terminal structure. The present invention was accomplished based on this finding.

That is, the present invention includes the following inventions.

1. A copolycarbonate comprising a unit (A) constituted of an ether diol residue represented by the following formula (1), a unit (B) constituted of a bisphenol residue represented by the following formula (2), and a unit (C) constituted of another diol residue, wherein
   (I) the unit (C) is at least one diol residue selected from the group consisting of aliphatic diol residue, alicyclic diol residue, oxylene glycol residue and diol residue having a cyclic ether structure;
   (II) the content of the unit (A) is 40 to 92 mol %, the content of the unit (B) is 5 to 57 mol %, and the content of the unit (C) is 3 to 55 mol % based on the total number of moles of the units (A), (B) and (C); and
   (III) the ratio of terminal groups falls within the ranges of the following expressions (i) and (ii):
   (i) 0.001<total number of hydroxyl groups derived from the unit (A) and the unit (C)/total number of all terminal groups<0.3

(ii) 0.02<the number of phenolic hydroxyl groups derived from the unit (B)/total number of all terminal groups<0.6

[In the above expressions, the total number of all terminal groups is the total number of the hydroxyl group of the ether diol, the phenolic hydroxyl group, the hydroxyl group of the aliphatic diol, the hydroxyl group of the alicyclic diol, the hydroxyl group of oxylene glycol, the hydroxyl group of the cyclic ether diol and all phenol carbonate terminals.]

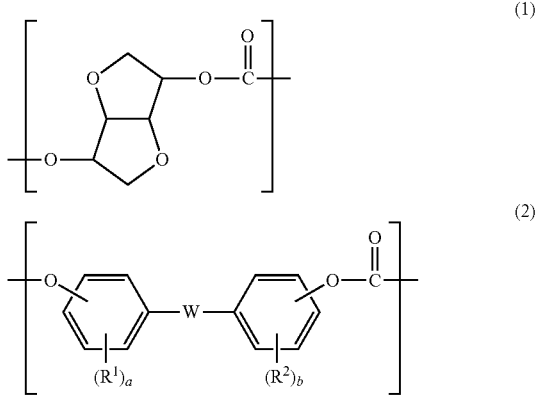

(In the above formula (2), $R^1$ and $R^2$ are each independently at least one group selected from the group consisting of hydrogen atom, halogen atom, alkyl group having 1 to 10 carbon atoms, alkoxy group having 1 to 10 carbon atoms, cycloalkyl group having 6 to 20 carbon atoms, cycloalkoxy group having 6 to 20 carbon atoms, alkenyl group having 2 to 10 carbon atoms, aryl group having 6 to 10 carbon atoms, aryloxy group having 6 to 10 carbon atoms, aralkyl group having 7 to 20 carbon atoms, aralkyloxy group having 7 to 20 carbon atoms, nitro group, aldehyde group, cyano group and carboxyl group, when there are two or more $R^1$'s and $R^2$'s, they may be the same or different, "a" and "b" are each an integer of 1 to 4, and W is at least one bond selected from the group consisting of a single bond and bonds represented by the following formulas (3):

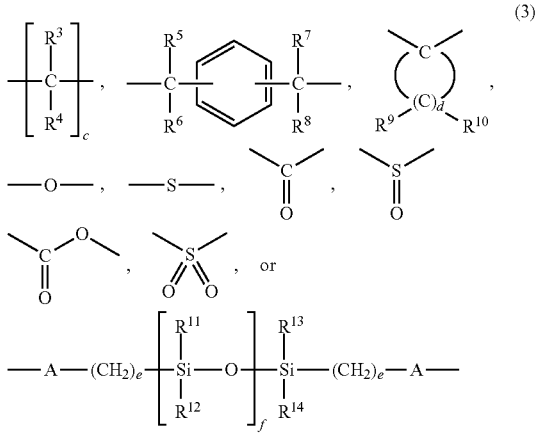

(In the above formulas (3), $R^3$, $R^4$, $R^5$, $R^6$, $R^7$, $R^8$, $R^9$ and $R^{10}$ are each independently at least one group selected from the group consisting of hydrogen atom, alkyl group having 1 to 10 carbon atoms, aryl group having 6 to 10 carbon atoms and aralkyl group having 7 to 20 carbon atoms, when there are two or more $R^3$'s, $R^4$'s, $R^5$'s, $R^6$'s, $R^7$'s, $R^8$'s, $R^9$'s and $R^{10}$'s, they may be the same or different, $R^{11}$, $R^{12}$, $R^{13}$ and $R^{14}$ are each independently at least one group selected from the group consisting of alkyl group having 1 to 10 carbon atoms, cycloalkyl group having 6 to 20 carbon atoms, alkenyl group having 2 to 10 carbon atoms, aryl group having 6 to 10 carbon atoms and aralkyl group having 7 to 20 carbon atoms, when there are two or more $R^{11}$'s, $R^{12}$'s, $R^{13}$'s and $R^{14}$'s, they may be the same or different, "c" is an integer of 1 to 10, "d" is an integer of 4 to 7, "e" is an integer of 1 to 3, and "f" is an integer of 1 to 100.)).

2. The copolycarbonate in the above paragraph 1, wherein the unit (A) represented by the above formula (1) is represented by the following formula (4).

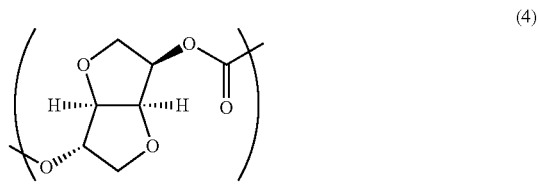

3. The copolycarbonate in the above paragraph 1, wherein the number of carbon atoms of the bisphenol A constituting the unit (B) is 24 or less.
4. The copolycarbonate in the above paragraph 1, wherein the unit (C) is constituted of an aliphatic diol residue having 2 to 44 carbon atoms.
5. The copolycarbonate in the above paragraph 1, wherein the unit (C) is at least one diol residue selected from the group consisting of ethylenediol residue, 1,3-propanediol residue, 1,4-butanediol residue, 1,5-pentanediol residue, 1,6-hexanediol residue, 1,8-octanediol residue and 1,10-decanediol residue.
6. The copolycarbonate in the above paragraph 1, wherein the unit (C) is at least one diol residue selected from the group consisting of cyclohexanedimethanol residue, tricyclodeancedimethanol residue, pentacyclopentadecanedimethanol residue and adamantanedimethanol residue.
7. The copolycarbonate in the above paragraph 1, wherein the unit (B) represented by the above formula (2) is at least one diol residue selected from the group consisting of α,α'-bis(4-hydroxyphenyl)-m-diisopropylbenzene residue, 1,1-bis(4-hydroxyphenyl)cyclohexane residue, 1,1-bis(4-hydroxyphenyl)-3,3,5-trimethylcyclohexane residue, 3,3'-dimethyl-4,4'-dihydroxydiphenyl sulfide residue, 2,2-bis(4-hydroxyphenyl)propane residue, 2,2-bis(4-hydroxy-3-methylphenyl)propane residue, 2,2-bis(4-hydroxyphenyl)-1,1,1,3,3,3-hexafluoropropane residue and 1,1-bis(4-hydroxyphenyl)decane residue.
8. The copolycarbonate in the above paragraph 1 which has a glass transition temperature (Tg) of 90 to 160° C.
9. The copolycarbonate in the above paragraph 1 which has a melt viscosity measured by a capillary rheometer at 240° C. of $1.10 \times 10^3$ Pa·s or less at a shear rate of 608 sec$^{-1}$.
10. The copolycarbonate in the above paragraph 1 which has a saturation water absorption coefficient of 3.5% or less.
11. The copolycarbonate in the above paragraph 1 which has a refractive index of 1.50 to 1.58 and an Abbe's number of 36 to 64.
12. The copolycarbonate in the above paragraph 1, wherein the content of the unit (A) is 40 to 85 mol %, the content of the unit (B) is 10 to 55 mol %, and the content of the unit (C) is 5 to 50 mol % based on the total number of moles of the units (A), (B) and (C).
13. The copolycarbonate in the above paragraph 1, wherein the content of the unit (A) is 45 to 80 mol %, the content of the unit (B) is 15 to 50 mol %, and the content of the unit (C) is 5 to 50 mol % based on the total number of moles of the units (A), (B) and (C).
14. A transparent molded article obtained from the copolycarbonate of the above paragraph or a composition comprising the copolycarbonate.

The copolycarbonate and transparent molded article thereof of the present invention are obtained only by the terpolymerization of the unit (A), the unit (B) and the unit (C). A polycarbonate obtained by blending homopolycarbonates of the unit (A), the unit (B) and the unit (C) or by blending a copolycarbonate obtained by copolymerizing the unit (A) and the unit (B) and a copolycarbonate obtained by copolymerizing the unit (B) and the unit (C) has high haze and cannot be used for application in transparent molded articles. It is assumed that this is because these three units are hardly mixed together due to a big difference in solubility parameter (SP value) among the unit (A), the unit (B) and the unit (C).

In the present invention, monomers constituting the unit (A), the unit (B) and the unit (C) differ from one another in boiling point and are an aromatic diol, aliphatic diol and alicyclic diol, or have different reactive groups such as a primary hydroxyl group, a secondary hydroxyl group and a tertiary hydroxyl group, respectively. Therefore, they differ in reactivity. When these three components are terpolymerized by an ordinary melt polymerization method, an unreacted diol is distilled off to the outside of the system in the latter stage of the reaction. As a result, a copolymer having a predetermined composition ratio is not obtained and also when the molar balance among terminal groups is greatly broken down, the polymerization degree may not become sufficiently high. Therefore, to carry out polymerization by using these three monomers which differ in boiling point and reactivity and precisely controlling the composition ratio, polymerization must be carried out under appropriate reaction conditions.

A terpolycarbonate having a predetermined composition ratio and a specific terminal structure can be obtained by carrying out polymerization under the reaction conditions found by the present invention, thereby making it possible to obtain a copolycarbonate and a transparent molded article thereof which have a high plant ratio and also excellent heat resistance, flowability and transparency and are prevented from undergoing a dimensional change by water absorption and coloring and producing a silver streak during molding.

Figure 1:
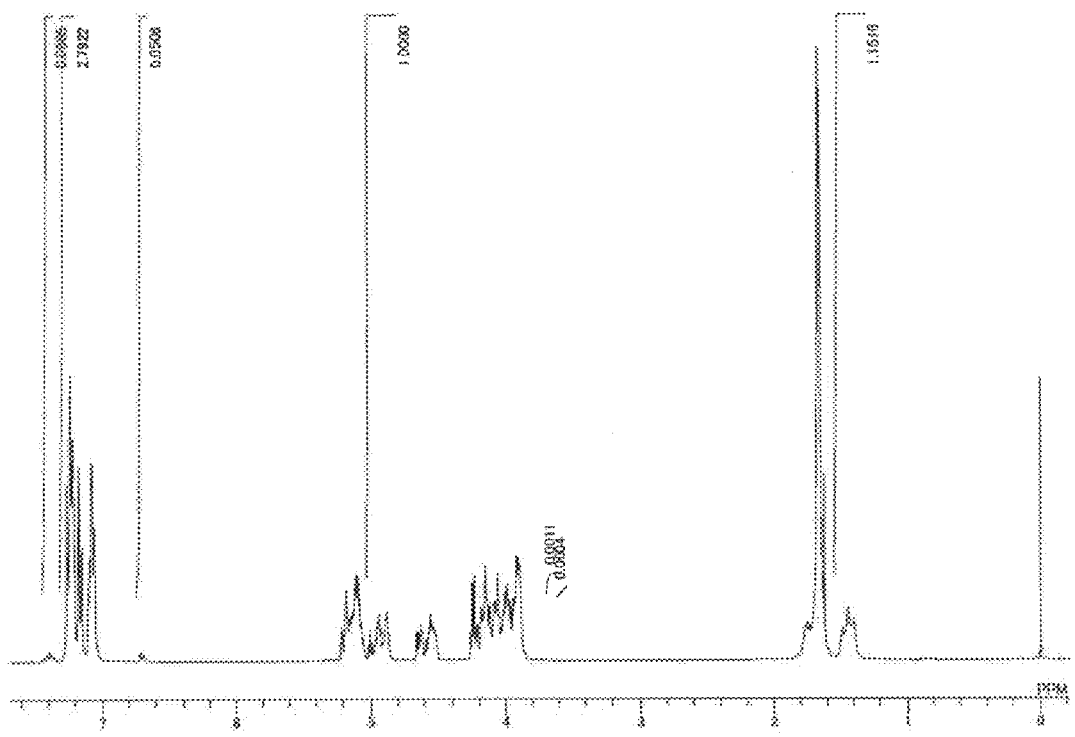
FIG. 1 is an NMR chart of a copolycarbonate produced in Example 1.

BEST MODE FOR CARRYING OUT THE INVENTION (Copolycarbonate)
(Unit (A))
The unit (A) of the copolycarbonate of the present invention is an ether diol residue represented by the following formula (5). Examples of the ether diol residue having the above structure include an isosorbide residue, an isomannide residue and an isoidide residue represented by the following formulas (6), (7) and (8), respectively, all of which have a stereoisomeric relationship with one another.

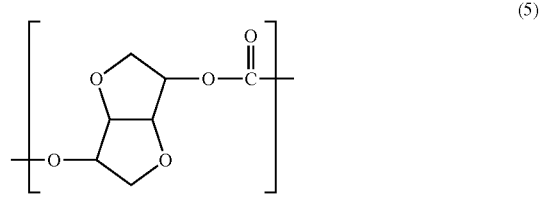

(5)

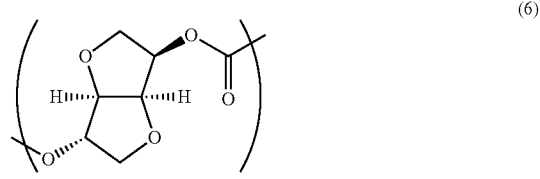

(6)

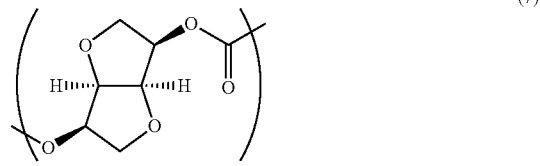

(7)

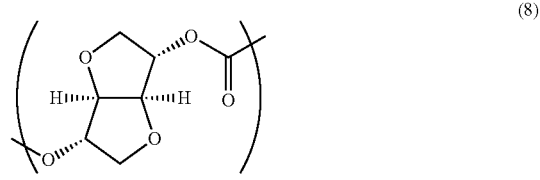

(8)

These sugar-derived ether diols forming a carbonate constituent unit are obtained from the biomass of the natural world and called "renewable resources". Isosorbide is obtained by hydrogenating D-glucose obtained from starch and dehydrating the obtained product. The other ether diols are obtained from similar reactions to the above reaction except for the starting material.

The unit (A) represented by the above formula (6) is preferably a polycarbonate resin containing a unit derived from isosorbide (1,4;3,6-dianhydro-D-sorbitol), represented by the formula (6). Isosorbide is an ether diol which can be easily produced from starch, can be acquired in abundance as a resource and is superior to isomnanide and isoidide in production ease, properties and application range.

(Unit (B))
The unit (B) is a carbonate unit constituted of a bisphenol residue and represented by the following formula (9).

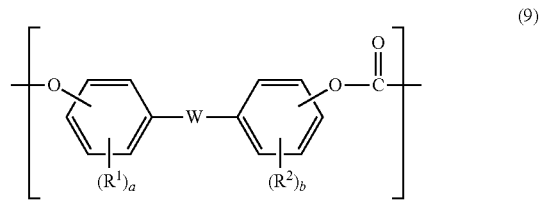

(9)

In the above formula (9), $R^1$ and $R^2$ are each independently at least one group selected from the group consisting of hydrogen atom, halogen atom, alkyl group having 1 to 10 carbon atoms, alkoxy group having 1 to 10 carbon atoms, cycloalkyl group having 6 to 20 carbon atoms, cycloalkoxy group having 6 to 20 carbon atoms, alkenyl group having 2 to 10 carbon atoms, aryl group having 6 to 10 carbon atoms, aryloxy group having 6 to 10 carbon atoms, aralkyl group having 7 to 20 carbon atoms, aralkyloxy group having 7 to 20 carbon atoms, nitro group, aldehyde group, cyano group and carboxyl group. When there are two or more $R^1$'s and $R^2$'s, they may be the same or different.

Examples of the halogen atom include fluorine atom, chlorine atom and bromine atom. Examples of the alkyl group having 1 to 10 carbon atoms include methyl group, ethyl group, propyl group, butyl group, pentyl group, hexyl group and octyl group. Examples of the alkoxy group having 1 to 10 carbon atoms include methoxy group, ethoxy group, propoxy group, butoxy group, pentoxy group, hexyloxy group and octyloxy group. Examples of the cycloalkyl group having 6 to 20 carbon atoms include cyclohexyl group, cyclooctyl group and cyclodecyl group. Examples of the cycloalkoxy group having 6 to 20 carbon atoms include cyclohexyloxy group, cyclooctyloxy group and cyclodecyloxy group. Examples of the alkenyl group having 2 to 10 carbon atoms include ethenyl group, propenyl group, butenyl group and hexenyl group. Examples of the aryl group having 6 to 10 carbon atoms include phenyl group and naphthyl group. Examples of the aryloxy group having 6 to 10 carbon atoms include phenyloxy group and naphthyloxy group. Examples of the aralkyl group having 7 to 20 carbon atoms include benzyl group. Examples of the aralkyloxy group having 7 to 20 carbon atoms include benzyloxy group.

"a" and "b" are each an integer of 1 to 4.

W is at least one bond selected from the group consisting of a single bond and bonds represented by the following formulas (10).

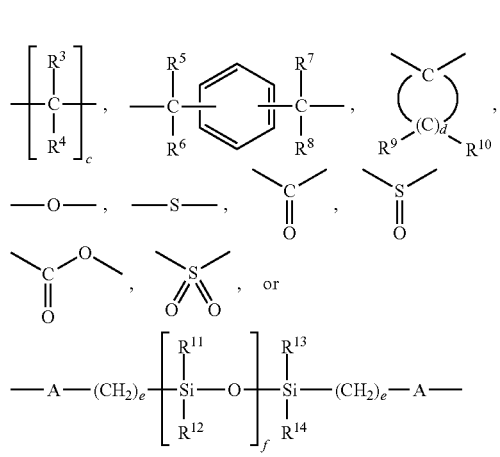

In the above formulas (10), $R^3$, $R^4$, $R^5$, $R^6$, $R^7$, $R^8$, $R^9$ and $R^{10}$ are each independently at least one group selected from the group consisting of hydrogen atom, alkyl group having 1 to 10 carbon atoms, aryl group having 6 to 10 carbon atoms and aralkyl group having 7 to 20 carbon atoms. When there are two or more $R^3$'s, $R^4$'s, $R^5$'s, $R^6$'s, $R^7$'s, $R^8$'s, $R^9$'s and $R^{10}$'s, they may be the same or different.

Examples of the alkyl group having 1 to 10 carbon atoms include methyl group, ethyl group, propyl group, butyl group, pentyl group, hexyl group and octyl group. Examples of the aryl group having 6 to 10 carbon atoms include phenyl group and naphthyl group. Examples of the arylkyl group having 7 to 20 carbon atoms include benzyl group.

$R^{11}$, $R^{12}$, $R^{13}$ and $R^{14}$ are each independently at least one group selected from the group consisting of alkyl group having 1 to 10 carbon atoms, cycloalkyl group having 6 to 20 carbon atoms, alkenyl group having 2 to 10 carbon atoms, aryl group having 6 to 10 carbon atoms and aralkyl group having 7 to 20 carbon atoms. When there are two or more $R^{11}$'s, $R^{12}$'s, $R^{13}$'s and $R^{14}$'s, they may be the same or different.

Examples of the alkyl group having 1 to 10 carbon atoms include methyl group, ethyl group, propyl group, butyl group, pentyl group, hexyl group and octyl group. Examples of the cycloalkyl group having 6 to 20 carbon atoms include cyclohexyl group, cyclooctyl group and cyclodecyl group. Examples of the alkenyl group having 2 to 10 carbon atoms include ethenyl group, propenyl group, butenyl group and hexenyl group. Examples of the aryl group having 6 to 10 carbon atoms include phenyl group and naphthyl group. Examples of the aralkyl group having 7 to 20 carbon atoms include benzyl group.

"c" is an integer of 1 to 10, "d" is an integer of 4 to 7, "e" is an integer of 1 to 3, and "f" is an integer of 1 to 100.

The number of carbon atoms of the bisphenol constituting the unit (B) is preferably 24 or less. When the number of carbon atoms of the bisphenol is larger than 24, the flowability of the copolycarbonate degrades, and an extrusion/molding step at a high temperature is required. Therefore, this is not preferred from the viewpoint of use in transparent molded articles due to coloration and the production of a silver streak.

Examples of the bisphenol include 4,4'-biphenol, 3,3',5,5'-tetrafluoro-4,4'-biphenol, α,α'-bis(4-hydroxyphenyl)-o-diisopropylbenzene, α,α'-bis(4-hydroxyphenyl)-m-diisopropylbenzene (commonly known as "bisphenol M"), α,α'-bis(4-hydroxyphenyl)-p-diisopropylbenzene, α,α'-bis(4-hydroxyphenyl)-m-bis(1,1,1,3,3,3-hexafluoroisopropyl)benzene, 1,1-bis(4-hydroxyphenyl)cyclohexane, 1,1-bis(4-hydroxyphenyl)-3,3,5-trimethylcyclohexane, 1,1-bis(4-hydroxyphenyl)-4-isopropylcyclohexane, 1,1-bis(3-cyclohexyl-4-hydroxyphenyl)cyclohexane, 1,1-bis(4-hydroxyphenyl)cyclopentane, 1,1-bis(3-fluoro-4-hydroxyphenyl)cyclohexane, 1,1-bis(4-hydroxyphenyl)perfluorocyclohexane, 4,4'-dihydroxydiphenyl ether, 4,4'-dihydroxy-3,3'-dimethyldiphenyl ether, 4,4'-dihydroxydiphenyl sulfone, 4,4'-dihydroxydiphenyl sulfoxide, 4,4'-dihydroxydiphenyl sulfide, 3,3'-dimethyl-4,4'-dihydroxydiphenyl sulfide, 3,3'-dimethyl-4,4'-dihydroxydiphenyl sulfone, 4,4'-dihydroxydiphenyl sulfone, 4,4'-dihydroxy-3,3'-diphenyl sulfide, 4,4'-dihydroxy-3,3'-diphenyl sulfoxide, 4,4'-dihydroxy-3,3'-diphenyl sulfone, 1,1-bis(4-hydroxyphenyl)methane, 1,1-bis(4-hydroxyphenyl)ethane, 2,2-bis(4-hydroxyphenyl)propane (commonly known as "bisphenol A"), 1,1-bis(4-hydroxyphenyl)-1-phenylethane, 2,2-bis(4-hydroxy-3-methylphenyl)propane (commonly known as "bisphenol C"), 2,2-bis(4-hydroxyphenyl)butane, 2,2-bis(4-hydroxyphenyl)pentane, 2,2-bis(4-hydroxy-3-phenylphenyl)propane, 2,2-bis(3-isopropyl-4-hydroxyphenyl)propane, 2,2-bis(3-t-butyl-4-hydroxyphenyl)propane, 2,2-bis(4-hydroxyphenyl)butane, 4,4-bis(4-hydroxyphenyl)heptane, 2,2-bis(4-hydroxyphenyl)octane, 1,1-bis(4-hydroxyphenyl)decane, 1,1-bis(3-methyl-4-hydroxyphenyl)decane, 1,1-bis(2,3-dimethyl-4-hydroxyphenyl)decane, 2,2-bis(3-bromo-4-hydroxyphenyl)propane, bis(4-hydroxyphenyl)diphenylmethane, 1,1-bis(4-hydroxyphenyl)-4-isopropylcyclohexane, 2,2-bis(4-hydroxyphenyl)-1,1,1,3,3,3-hexafluoropropane (commonly known as "bisphenol AF"), 2,2-bis(4-hydroxy-3-methylphenyl)-1,1,1,3,3,3-hexafluoropropane, 2,2-bis(3,5-dimethyl-4-hydroxyphenyl)-1,1,1,3,3,3-hexafluoropropane, 2,2-bis(3-fluoro-4-hydroxyphenyl)-1,1,1,3,3,3-hexafluoropropane, 2,2-bis(3,5-difluoro-4-hydroxyphenyl)-1,1,1,3,3,3-hexafluoropropane, 2,2-bis(3,5-dibromo-4-hydroxyphenyl) propane, 2,2-bis(3,5-dichloro-4-hydroxyphenyl)propane, 2,2-bis(3,5-dimethyl-4-hydroxyphenyl)propane and 2,2-bis(3-cyclohexyl-4-hydroxyphenyl)propane.

Out of these, bisphenol M, 1,1-bis(4-hydroxyphenyl)cyclohexane, 1,1-bis(4-hydroxyphenyl)-3,3,5-trimethylcyclohexane, 3,3'-dimethyl-4,4'-dihydroxydiphenyl sulfide, bisphenol A, bisphenol C, bisphenol AF and 1,1-bis(4-hydroxyphenyl)decane are preferred.

Bisphenol A which can be acquired at low cost is particularly preferred. These bisphenols may be used alone or in combination of two or more.

(Unit (C))

The unit (C) is a unit constituted of at least one diol residue selected from the group consisting of an aliphatic diol residue, alicyclic diol residue, oxylene glycol residue and diol residue having a cyclic ether structure.

At least one diol selected from the group consisting of an aliphatic diol, alicyclic diol, oxylene glycol and diol having a cyclic ether structure constituting the unit (C) has a boiling point at normal pressure (100 kPa) of preferably 190° C. or higher, more preferably 200° C. or higher and much more preferably 210° C. or higher. When the boiling point is lower than 190° C., an unreacted diol tends to be distilled off to the outside of the system in the latter stage of a polymerization reaction, thereby making it impossible to control the composition ratio of the copolycarbonate accurately.

Further, since the above unit (C) can provide flowability with a small amount, it is preferably a unit constituted of an aliphatic diol residue having 2 to 44 carbon atoms.

The aliphatic diol residue constituting the unit (C) is more preferably at least one aliphatic diol residue selected from the group consisting of ethylenediol residue, 1,3-propanediol residue, 1,4-butanediol residue, 1,5-pentadiol residue, 1,6-hexanediol residue, 1,8-octanediol residue and 1,10-decanediol residue.

When the boiling point of the aliphatic diol is too low, it is easily distilled off at the time of polymerization, thereby making it difficult to control the molar ratio of the polycarbonate resin copolymer. When the aliphatic diol has a long chain, it is difficult to acquire its raw materials, thereby boosting its cost. Therefore, the unit (C) is particularly preferably selected from a 1,3-propanediol residue, 1,4-butanediol residue, 1,5-pentanediol residue and 1,6-hexanediol residue.

These aliphatic diols may be used alone or in combination of two or more.

Although the alicylic diol constituting the unit (C) is not particularly limited, it is generally a compound having a five-membered ring structure or a six-membered ring structure. The six-membered ring structure may be fixed by a covalent bond in a chair or boat form.

Examples of the above alicyclic diol residue constituting the unit (C) include alicyclic diol residues represented by the following formulas (11) and (12).

—OCH$_2$—R$^1$—CH$_2$O—    (11)

—O—R$^2$—O—    (12)

In the formulas (11) and (12), R$^1$ and R$^2$ are each a cycloalkyl group having 4 to 20 carbon atoms or cycloalkoxyl group having 6 to 20 carbon atoms. Examples of the cycloalkyl group having 4 to 20 carbon atoms include cyclobutyl group, cyclopentyl group, cyclohexyl group, cyclooctyl group and cyclodecyl group. Examples of the cycloalkoxyl group having 6 to 20 carbon atoms include cyclobutyloxy group, cyclopentyloxy group, cyclohexyloxy group, cyclooctyloxy group and cyclodecyloxy group.]

Examples of the unit (C) represented by the above formula (11) include 1,2-cyclohexanedimethanol residue, 1,3-cyclohexanedimethanol residue, 1,4-cyclohexanedimethanol residue, tricyclodecanedimethanol residue, pentacyclodecane pentadimethanol residue, 2,6-decalindimethanol residue, 1,5-decalindimethanol residue, 2,3-decalindimethanol residue, 2,3-norbornanedimethanol residue, 2,5-norbornanedimethanol residue and 1,3-adamantanedimethanol residue.

Examples of the unit (C) represented by the above formula (12) include 1,2-cyclohexanediol residue, 1,3-cyclohexanediol residue, 1,4-cyclhexanediol residue, tricyclodecanediol residue, pentacyclodecanediol residue, 2,6-decalindiol residue, 1,5-decalindiol residue, 2,3-decalindiol residue, 2,3-norbornanediol residue, 2,5-norbornanediol residue and 1,3-adamantanediol residue.

The unit (C) is preferably at least one diol residue selected from the group consisting of cyclohexanedimethanol residue, tricyclodecanedimethanol residue, pentacyclopentadecanedimethanol residue and adamantanedimethanol residue.

Further, since the above unit (C) can provide flowability with a small amount, it is preferably an alicyclic diol residue represented by the above formula (11). These alicyclic diols may be used alone or in combination of two or more.

Examples of the oxyalkylene glycol constituting the unit (C) include diethylene glycol, triethylene glycol, tetraethylene glycol and polyethylene glycol.

Examples of the diol having a cyclic ether structure constituting the unit (C) include spiroglycol and dioxane glycol.

(Composition Ratio)

As for the molar ratios of the units (A), (B) and (C) in the copolycarbonate of the present invention, the molar ratio of the unit (A) is 40 to 92 mol %, the molar ratio of the unit (B) is 5 to 57 mol %, and the molar ratio of the unit (C) is 3 to 55 mol % based on the total number of moles of the units (A), (B) and (C). The total amount of the units (A), (B) and (C) is 100 mol %. By setting the above molar ratios, a copolycarbonate which has a high plant ratio and excellent heat resistance, flowability and transparency and is prevented from undergoing a dimensional change by water absorption, coloring and producing a silver streak, and a transparent molded article thereof can be obtained.

The molar ratio of the above unit (A) of the copolycarbonate of the present invention is preferably 40 to 85 mol % and more preferably 45 to 80 mol %. The molar ratio of the unit (B) of the copolycarbonate of the present invention is preferably 10 to 55 mol % and more preferably 15 to 50 mol %. The molar ratio of the unit (C) of the copolycarbonate of the present invention is preferably 5 to 50 mol % and more preferably 5 to 40 mol %.

When the molar ratio of the unit (A) is lower than 40 mol %, the plant ratio lowers disadvantageously. When the molar ratio of the unit (A) is higher than 92 mol %, the water absorption coefficient of the obtained copolycarbonate becomes high, whereby the dimensional change of a molded article by water absorption becomes large disadvantageously.

When the molar ratio of the above unit (A) is a minimum of 40 mol %, the total molar ratio of the units (B) and (C) becomes 60 mol % and when the molar ratio of the unit (C) is lower than 3 mol %, the glass transition temperature and the melt viscosity become too high, thereby requiring extrusion/molding at a temperature of 250° C. or higher with the result that coloration and the production of a silver streak are feared.

When the molar ratio of the unit (C) is higher than 55 mol %, sufficiently high heat resistance is not obtained.

When the molar ratio of the above unit (A) is a maximum of 92 mol % and the molar ratio of the unit (B) is lower than 5 mol %, the weight ratio of the unit (A) in the copolycarbonate becomes extremely high, whereby the water absorption coefficient of the copolycarbonate becomes high, or the thermal decomposition temperature lowers disadvantageously.

That is, the unit (A) provides a high plant ratio and high heat resistance (high TG, the unit (B) provides high heat resistance (high thermal decomposition temperature) and low water absorbing property, and the unit (C) provides flowability. By controlling the copolymerization ratio as described above, there can be obtained a copolycarbonate which has good balance among plant ratio, heat resistance, flowability and low water absorbing property, excellent transparency and is prevented from coloring and producing a silver streak during molding as well as a transparent molded article thereof.

The molar ratio is measured and calculated by the protein NMR of the JNM-AL400 of JEOL Ltd.

(Terminal OH Ratio)

The total amount of OH terminal groups derived from the unit (A) and the unit (C) of the copolycarbonate of the present invention satisfies 0.001<total number of hydroxyl groups derived from the unit (A) and the unit (C)/total number of all terminal groups<0.3, more preferably 0.001<total number of hydroxyl groups derived from the unit (A) and the unit (C)/total number of all terminal groups<0.25. It satisfies much more preferably 0.001<total number of hydroxyl groups derived from the unit (A) and the unit (C)/total number of all terminal groups<0.2. The total number of all terminal groups is the total number of (hydroxyl group of an ether diol+phenolic hydroxyl group+hydroxyl group of an aliphatic diol or alicyclic diol+all phenyl carbonate terminals). When the value of total number of hydroxyl groups derived from the unit (A) and the unit (C)/total number of all terminal groups is 0.3 or more, a lot of hydroxyl groups derived from the unit (A) and the unit (C) having low heat stability remain with the result that the heat stability of the copolycarbonate degrades and decomposition occurs at the time of mold residence disadvantageously. Further, since the water absorption coefficient becomes high, the dimensional change becomes large disadvantageously.

The amount of the phenolic OH terminal group derived from the unit (B) of the copolycarbonate of the present invention satisfies 0.02<number of phenolic hydroxyl groups derived from the unit (B)/total number of all terminal groups<0.6. It satisfies preferably 0.04<number of phenolic hydroxyl groups derived from the unit (B)/total number of all terminal groups<0.55. It satisfies more preferably 0.06<number of phenolic hydroxyl groups derived from the unit (B)/total number of all terminal groups<0.50. When 0.02<number of phenolic hydroxyl groups derived from the unit (B)/total number of all terminal groups<0.6, the water absorption coefficient is reduced, whereby when the copolycarbonate is used for application in molded articles, the dimensional change becomes small advantageously. When the value of number of phenolic hydroxyl groups derived from the unit (B)/total number of all terminal groups is smaller than 0.02, polymerizability greatly degrades, whereby the target molecular weight may not be obtained, and the reaction time becomes too long with the result that the obtained resin colors disadvantageously.

(Glass Transition Temperature: Tg)

The glass transition temperature (Tg) of the copolycarbonate of the present invention is preferably 90 to 160° C. and more preferably 100 to 150° C. When the glass transition temperature (Tg) is lower than 90° C., heat resistance degrades. When the glass transition temperature (Tg) is higher than 160° C., viscosity becomes too high at the time of melt polymerization, thereby making agitation and discharge difficult. When a polycarbonate having an isosorbide residue in the skeleton is molded at a high temperature, a silver streak is produced by decomposition. Therefore, the glass transition temperature is preferably 160° C. or lower so that molding at a low temperature becomes possible. The glass transition temperature (Tg) is measured by using the 2910 DSC of TA Instruments Japan at a temperature elevation rate of 20° C./min.

(5% Weight Loss Temperature: Td)

The 5% weight loss temperature (Td) of the copolycarbonate of the present invention measured in a nitrogen atmosphere is preferably 340° C. or higher, more preferably 345° C. or higher and much more preferably 350° C. or higher. When the 5% weight loss temperature (Td) in a nitrogen atmosphere falls within the above range, coloration and the production of a silver streak during molding can be suppressed advantageously. The 5% weight loss temperature in a nitrogen atmosphere is measured in a nitrogen atmosphere at a temperature elevation rate of 20° C./min (start temperature of 40° C.) by using the 2950 TGA of TA Instruments Japan.

The 5% weight loss temperature (Td) of the copolycarbonate when measured in an air atmosphere is preferably 335° C. or higher, more preferably 350° C. or higher and much more preferably 355° C. or higher. When the 5% weight loss temperature (Td) in an air atmosphere falls within the above range, coloration and the production of a silver streak during molding caused by the thermal decomposition of the isosorbide skeleton can be suppressed advantageously. The 5% weight loss temperature (Td) in an air atmosphere is measured in an air atmosphere at a temperature elevation rate of 20° C./min (start temperature of 40° C.) by using the 2950 TGA of TA Instruments Japan.

(Color of Molded Plate (b Value))

The b value of a 2.0 mm-thick portion of a triple plate (arithmetic average surface roughness Ra: 0.03 μm) obtained by molding the copolycarbonate of the present invention is preferably 15 or less, more preferably 11 or less and much more preferably 7 or less.

(Residence Stability)

The incidence of a silver streak in a triple plate obtained by molding the copolycarbonate of the present invention after 10 minutes of residence is preferably 30% or less, more preferably 25% or less and much more preferably 20% or less. Within the above range, the production of a silver streak caused by the thermal decomposition of the resin is suppressed, thereby making it possible to obtain a transparent method article stably.

(Melt Viscosity)

The copolycarbonate of the present invention has a melt viscosity measured by a capillary rheometer at 240° C. of $1.10 \times 10^3$ Pa·s or less, more preferably $1.05 \times 10^3$ Pa·s or less and much more preferably $1.00 \times 10^3$ Pa·s or less at a shear rate of 608 $sec^{-1}$. When the melt viscosity is higher than $1.10 \times 10^3$ Pa·s, flowability lowers and precision molding becomes difficult with the result that the molding temperature must be raised. When the copolycarbonate containing the unit (A) in the skeleton is molded at a high temperature, there occur problems such as coloration and the production of a silver streak disadvantageously.

(Saturation Water Absorption Coefficient)

The saturation water absorption coefficient in 23° C. water of a 1 mm-thick molded plate obtained by molding the copolycarbonate of the present invention is preferably 3.5% or less, more preferably 3.0% or less and much more preferably 2.0% or less. When the water absorption coefficient falls within the above range, the copolycarbonate is preferred as it has moist heat resistance and a low dimensional change rate. When the water absorption coefficient is outside the above range, cracking may occur by expansion at the time of water absorption. Therefore, the copolycarbonate is not preferred as a molding material.

(Refractive Index)

The copolycarbonate of the present invention has a refractive index of 1.50 to 1.58, more preferably 1.51 to 1.57 and much more preferably 1.52 to 1.56. When the refractive index is lower than 1.50 and the copolycarbonate is used as a lens, a thin lens cannot be manufactured disadvantageously. Since there is a trade-off relationship between refractive index and Abbe's number, when the refractive index is made higher than 1.58, the Abbe's number decreases, whereby when the copolycarbonate is used as a lens, color unevenness occurs disadvantageously.

(Abbe's Number)

The copolycarbonate of the present invention has an Abbe's number of preferably 36 to 64, more preferably 37 to 63 and much more preferably 38 to 62. When the Abbe's number is smaller than 36, chroma aberration becomes large, whereby when it is used as a lens, the lens is not preferred. Since there is a trade-off relationship between refractive index and Abbe's number, when the Abbe's number is made larger than 64, the refractive index lowers, whereby when the copolycarbonate is used as a lens, it is difficult to manufacture a thin lens disadvantageously.

(Production Method)

The copolycarbonate can be produced by melt polymerizing an ether diol represented by the following formula (13), a bisphenol, an aliphatic diol or alicyclic diol and diester carbonate.

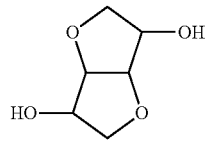

(13)

The diester carbonate is an ester such as an aryl group having 6 to 12 carbon atoms which may be substituted or aralkyl group. Specific examples thereof include diphenyl carbonate, ditolyl carbonate, bis(chlorophenyl)carbonate and bis(m-cresyl)carbonate. Out of these, diphenyl carbonate is particularly preferred.

The amount of diphenyl carbonate is preferably 0.97 to 1.10 moles and more preferably 0.99 to 1.05 moles based on 1 mole of the total of all dihydroxy compounds.

To accelerate the polymerization rate in the melt polymerization method, a polymerization catalyst may be used. The polymerization catalyst is selected from an alkali metal compound, an alkali earth metal compound, a nitrogen-containing compound and a metal compound. Organic acid salts, inorganic salts, oxides, hydroxides, hydrides, alkoxides and quaternary ammonium hydroxides of an alkali metal or an alkali earth metal are preferably used as the above compounds, and these compounds may be used alone or in combination.

Examples of the alkali metal compound include sodium hydroxide, potassium hydroxide, cesium hydroxide, lithium hydroxide, sodium hydrogen carbonate, sodium carbonate, potassium carbonate, cesium carbonate, lithium carbonate, sodium acetate, potassium acetate, cesium acetate, lithium acetate, sodium stearate, potassium stearate, cesium stearate, lithium stearate, sodium borohydride, sodium benzoate, potassium benzoate, cesium benzoate, lithium benzoate, disodium hydrogen phosphate, dipotassium hydrogen phosphate, dilithium hydrogen phosphate, disodium phenylphosphate, disodium salts, dipotassium salts, dicesium salts and dilithium salts of bisphenol A, and sodium salts, potassium salts, cesium salts and lithium salts of phenol.

Examples of the alkali earth metal compound include magnesium hydroxide, calcium hydroxide, strontium hydroxide, barium hydroxide, magnesium carbonate, calcium carbonate, strontium carbonate, barium carbonate, magnesium diacetate, calcium diacetate, strontium diacetate and barium diacetate.

Examples of the nitrogen-containing compound include quaternary ammonium hydroxides having an alkyl or aryl group such as tetramethylammonium hydroxide, tetraethylammonium hydroxide, tetrapropylammonium hydroxide, tetrabutylammonium hydroxide and trimethylbenzylammonium hydroxide. Tertiary amines such as triethylamine, dimethylbenzylamine and triphenylamine, and imidazoles such as 2-methylimidazole, 2-phenylimidazole and benzimidazole may be used. Bases and basic salts such as ammonia, tetramethylammonium borohydride, tetrabutylammonium borohydride, tetrabutylammonium tetraphenylborate and tetraphenylammonium tetraphenylborate may also be used. Examples of the metal compound include zinc aluminum compounds, germanium compounds, organic tin compounds, antimony compounds, manganese compounds, titanium compounds and zirconium compounds. These compounds may be used alone or in combination of two or more.

When the alkali metal compound and/or the alkali earth metal compound is used as the polymerization catalyst, the amount of the polymerization catalyst is preferably $1 \times 10^{-9}$ to $1 \times 10^{-3}$ equivalent, more preferably $1 \times 10^{-8}$ to $1 \times 10^{-4}$ equivalent and much more preferably $1 \times 10^{-7}$ to $1 \times 10^{-5}$ equivalent based on 1 mole of the diol component.

When the nitrogen-containing compound is used as the polymerization catalyst, the amount of the polymerization catalyst is preferably $1 \times 10^{-7}$ to $1 \times 10^{-1}$ equivalent, more preferably $1 \times 10^{-6}$ to $1 \times 10^{-2}$ equivalent and much more preferably $1 \times 10^{-5}$ to $1 \times 10^{-3}$ equivalent based on 1 mole of the diol component.

The melt polycondensation reaction is carried out under heating and agitation in an inert atmosphere under reduced pressure while the formed monohydroxy compound is distilled off as having already been known. The melt polycondensation reaction may be carried out in a batch manner, continuous manner or a combination thereof. Melt polymerization may be carried out in two or more stages. In order to carry out copolymerization so as to achieve a predetermined composition ratio by using three monomers like this reaction, it is necessary to control the reaction temperature and the reaction pressure precisely. An example of the melt polycondensation reaction is explained below. The production method is not limited to this.

That is, this reaction comprises an EI reaction step in which a transesterification reaction is carried out and a PA reaction step in which a polymerization reaction is carried out. The EI reaction step is a step for producing an oligomer by reacting three diol components with a carbonate precursor such as diester carbonate whereas the PA reaction step is a step for obtaining a polymer by polycondensing the oligomers produced in the EI reaction step.

The EI reaction step is carried out at a final vacuum degree of 40 kPa to 8 kPa and a final resin temperature of 160 to 220°

C. so as to distill off a monohydroxy compound produced as a side-reaction product in an amount of 70 to 85% of the theoretical amount.

The theoretical amount of the monohydroxy compound is equivalent to 2 times the number of moles of the charged diester carbonate.

The final vacuum degree is preferably 35 to 10 kPa. The depressurization rate is preferably 20 to 0.5 kPa/min and more preferably 15 to 1 kPa/min.

The final resin temperature is preferably 180 to 210° C. When the final resin temperature is 160° C. or higher, reactivity becomes high, thereby reducing the reaction time with the result of high productivity. When the final resin temperature is 220° C. or lower, an unreacted ether diol is hardly deteriorated and the color of the obtained polymer is good.

When the final vacuum degree in the EI reaction step is too low, the value of number of phenolic hydroxyl groups derived from the unit (B)/total number of all terminal groups represented by the expression (ii) becomes small.

When the final resin temperature and the final vacuum degree in the EI reaction step are too high, the value of total number of hydroxyl groups derived from the unit (A) and the unit (C)/total number of all terminal groups represented by the expression (i) becomes large and also the value of number of phenolic hydroxyl groups/total number of all terminal groups represented by the expression (ii) becomes large.

At the time of transition from the EI reaction step to the PA reaction step, the amount of the monohydroxy compound distilled off is preferably 75 to 85% of the theoretical amount. When the amount of the monohydroxy compound distilled off falls within the above range, the reaction rate of the diol constituting the unit (C) is 50 to 80% so that an unreacted diol constituting the unit (C) and having a low boiling point is hardly distilled off to the outside of the system in the PA reaction step. When the amount of the monohydroxy compound distilled off is smaller than 70% of the theoretical amount, the reaction rate of the aliphatic diol or the alicyclic diol becomes unsatisfactory, and the unreacted diol constituting the unit (C) is distilled off to the outside of the system. As a result, the composition ratio of the obtained polymer is shifted from the proper range and also the molar balance between the hydroxyl group and the carbonate group at the ends of the polymer is lost, whereby the polymerization degree may not be fully increased in the latter stage of the PA reaction. Meanwhile, when the amount of the monohydroxy compound distilled off is more than 85% at the time of transition to the PA reaction step, the polymerization degree becomes too high, whereby the melt viscosity suddenly rises, thereby causing problems such as the reduction of yield and a discharge failure.

The ether diol constituting the unit (A) has higher reactivity than the diol constituting the unit (C). When the reaction rate of the hydroxyl group of the aliphatic diol or the alicyclic diol falls within the above range, at the time of transition to the PA reaction step, it is hardly conceivable that the unreacted ether diol remains in an amount that causes the above problems.

The bisphenol constituting the unit (B) has lower reactivity than the ether diol or the diol constituting the unit (C), and the amount of the residual unreacted bisphenol at the time of transition to the PA reaction step is relatively large. However, since the bisphenol has a high boiling point and is not likely to be distilled off to the outside of the system at the time of transition to the PA reaction step, when the reaction rate of the hydroxyl group of the diol constituting the unit (C) falls within the above range, there does not occur a problem such as a shift of the composition ratio.

The PA reaction step consists of a former step and a latter step. That is, the former step of the PA reaction is a step for carrying out transesterification at a final vacuum degree of 8 to 1 kPa and a final resin temperature of 210 to 240° C. to obtain a polycarbonate resin having a specific viscosity of 0.03 or more to less than 0.2. In the former step, the oligomer of the copolycarbonate transesterified in the EI reaction step is further polymerized.

The final vacuum degree is more preferably 5 to 1 kPa. The depressurization rate is preferably 5 kPa/min to 0.1 kPa/min. Preferably, transesterification is carried out to obtain a polycarbonate resin having a specific viscosity of 0.05 or more to less than 0.2. The final resin temperature is more preferably 220 to 235° C. Preferably, the temperature is gradually raised from the temperature of the EI reaction step and does not exceed the final temperature in mid-course. When the final temperature is 240° C. or lower, the remaining ether diol hardly deteriorates and the color of the obtained polymer is good. At a temperature of 210° C. or higher, the reaction tends to proceed and the ether diol hardly deteriorates due to its heat history so that the color of the polymer is good. At a final vacuum degree of 8 kPa or less, the phenol readily distills off and the reaction readily proceeds, whereby the ether diol hardly deteriorates due to its heat history and the color of the polymer is good. At a final vacuum degree of 1 kPa or more, molar balance is hardly lost and the molecular weight tends to increase.

The latter step of the PA reaction is a step for carrying out transesterification at a final vacuum degree of less than 1 kPa and a final resin temperature of 225 to 255° C. to obtain a polycarbonate resin having a specific viscosity of 0.2 to 0.5. In the latter step, the polycarbonate resin polymerized in the former step is further polymerized. At a final vacuum degree of less than 1 kPa, the formed phenol hardly remains in the system, the color of the resin is excellent, and a decomposition reaction is suppressed advantageously. The final vacuum degree is much more preferably 0.5 kPa or less. At 225° C. or higher, the melt viscosity does not become too high and a problem such as the reduction of yield or a discharge failure hardly occurs. At 255° C. or lower, the ether diol residue hardly decomposes, and the color of the polymer is good. The final resin temperature is much more preferably 230 to 250° C. The specific viscosity of the polycarbonate resin is adjusted to 0.25 to 0.45 through a polymerization reaction. Preferably, the temperature is gradually raised from the temperature of the former step and does not exceed the final temperature in mid-course.

In this reaction, an end-sealing agent and an antioxidant may be optionally added. In the latter stage of the reaction, a catalyst deactivator may be added. As the catalyst deactivator, known catalyst deactivators may be used effectively. Out of these, ammonium salts and phosphonium salts of sulfonic acid are preferred. Salts of dodecylbenzenesulfonic acid such as tetrabutylphosphonium salts of dodecylbenzenesulfonic acid, and salts of paratoluenesulfonic acid such as tetrabutylammonium salts of paratoluenesulfonic acid are more preferred.

As the ester of sulfonic acid, methyl benzenesulfonate, ethyl benzenesulfonate, butyl benzenesulfonate, octyl benzenesulfonate, phenyl benzenesulfonate, methyl paratoluenesulfonate, ethyl paratoluenesulfonate, butyl paratoluenesulfonate, octyl paratoluenesulfonate and phenyl paratoluenesulfonate are preferably used. Out of these, tetrabutylphosphonium salts of dodecylbenzenesulfonic acid are most preferably used.

When at least one polymerization catalyst selected from alkali metal compounds and/or alkali earth metal compounds is used, the amount of the catalyst deactivator is preferably 0.1 to 10 moles, more preferably 0.3 to 5 moles and much more preferably 0.5 to 3 moles based on 1 mole of the catalyst.

Additives such as a heat stabilizer, plasticizer, optical stabilizer, polymerization metal deactivator, flame retardant, lubricant, antistatic agent, surfactant, antibacterial agent, ultraviolet absorbent and release agent may be optionally added according to purpose.

The copolycarbonate of the present invention preferably contains a heat stabilizer in particular so as to suppress the reduction of molecular weight and the deterioration of color during extrusion/molding. Since the ether diol residue as the unit (A) tends to be deteriorated and colored by heat and oxygen, a phosphorus-based stabilizer is preferably contained as the heat stabilizer. The phosphorus-based stabilizer is preferably a pentaerythritol type phosphite compound or a phosphite compound which reacts with a dihydric phenol and has a cyclic structure.

Examples of the above pentaerythritol type phosphite compound include distearyl pentaerythritol diphosphite, bis(2,4-di-tert-butylphenyl)pentaerythritol diphosphite, bis(2,6-di-tert-butyl-4-methylphenyl)pentaerythritol diphosphite, bis(2,6-di-tert-butyl-4-ethylphenyl)pentaerythritol diphosphite, phenyl bisphenol A pentaerythritol diphosphite, bis(nonylphenyl)pentaerythritol diphosphite and dicyclohexyl pentaerythritol diphosphite. Out of these, distearyl pentaerythritol diphosphite and bis(2,4-di-tert-butylphenyl) pentaerythritol diphosphite are particularly preferred.

Examples of the phosphite compound which reacts with a dihydric phenol and has a cyclic structure include 2,2'-methylenebis(4,6-di-tert-butylphenyl) (2,4-di-tert-butylphenyl) phosphite, 2,2'-methylenebis(4,6-di-tert-butylphenyl)(2-tert-butyl-4-methylphenyl)phosphite, 2,2'-methylenebis(4-methyl-6-tert-butylphenyl) (2-tert-butyl-4-methylphenyl) phosphite, 2,2'-ethylidenebis(4-methyl-6-tert-butylphenyl) (2-tert-butyl-4-methylphenyl)phosphite, 2,2'-methylene-bis-(4,6-di-t-butylphenyl)octyl phosphite and 6-tert-butyl-4-[3-[(2,4,8,10)-tetra-tert-butyldibenzo[d, f] [1,3,2]dioxaphosphepin-6-yl]oxy]propyl]-2-methyl phenol.

Other phosphorus-based stabilizers include phosphite compounds except for the above compounds, phosphonite compounds and phosphate compounds.

The above phosphite compounds include triphenyl phosphite, tris(nonylphenyl)phosphite, tridecyl phosphite, trioctyl phosphite, trioctadecyl phosphite, dodecylmonophenyl phosphite, dioctylmonophenyl phosphite, diisopropylmonophenyl phosphite, monobutyldiphenyl phosphite, monodecyldiphenyl phosphite, monooctyldiphenyl phosphite, 2,2-methylenebis(4,6-di-tert-butylphenyl)octyl phosphite, tris(diethylphenyl)phosphite, tris(di-iso-propylphenyl) phosphite, tris(di-n-butylphenyl)phosphite, tris(2,4-di-tert-butylphenyl)phosphite and tris(2,6-di-tert-butylphenyl) phosphite.

The phosphate compounds include tributyl phosphate, trimethyl phosphate, tricresyl phosphate, triphenyl phosphate, trichlorophenyl phosphate, triethyl phosphate, diphenylcresyl phosphate, diphenylmonoorthoxenyl phosphate, tributoxyethyl phosphate, dibutyl phosphate, dioctyl phosphate and diisopropyl phosphate. Triphenyl phosphate and trimethyl phosphate are preferred.

The phosphonite compounds include tetrakis(2,4-di-tert-butylphenyl)-4,4'-biphenylene diphosphonite tetrakis(2,4-di-tert-butylphenyl)-4,3'-biphenylene diphosphonite, tetrakis(2,4-di-tert-butylphenyl)-3,3'-biphenylene diphosphonite, tetrakis(2,6-di-tert-butylphenyl)-4,4'-biphenylene diphosphonite, tetrakis(2,6-di-tert-butylphenyl)-4,3'-biphenylene diphosphonite, tetrakis(2,6-di-tert-butylphenyl)-3,3'-biphenylene diphosphonite, bis(2,4-di-tert-butylphenyl)-4-phenyl-phenyl phosphonite, bis(2,4-di-tert-butylphenyl)-3-phenyl-phenyl phosphonite, bis(2,6-di-n-butylphenyl)-3-phenyl-phenyl phosphonite, bis(2,6-di-tert-butylphenyl)-4-phenyl-phenyl phosphonite and bis(2,6-di-tert-butylphenyl)-3-phenyl-phenyl phosphonite. Tetrakis(di-tert-butylphenyl)-biphenylene diphosphonites and bis(di-tert-butylphenl)-phenyl-phenyl phosphonites are preferred, and tetrakis(2,4-di-tert-butylphenyl)-biphenylene diphosphonites and bis(2,4-di-tert-butylphenyl)-phenyl-phenyl phosphonites are more preferred. The phosphonite compound may be and is preferably used in combination with a phosphite compound having an aryl group substituted by 2 or more alkyl groups.

The phosphonate compounds include dimethyl benzenephosphonate, diethyl benzenephosphonate and dipropyl benzenephosphonate.

The above phosphorus-based heat stabilizers may be used alone or in combination of two or more.

The above phosphorus-based stabilizers may be used alone or in combination of two or more, and at least a pentaerythritol type phosphite compound or a phosphite compound having a cyclic structure is preferably used in an effective amount. The phosphorus-based stabilizer is used in an amount of preferably 0.001 to 1 part by weight, more preferably 0.01 to 0.5 part by weight and much more preferably 0.01 to 0.3 part by weight based on 100 parts by weight of the polycarbonate resin.

In the copolycarbonate of the present invention, a hindered phenol-based heat stabilizer may be added as a heat stabilizer in combination with a phosphorus-based heat stabilizer so as to suppress the reduction of molecular weight and the deterioration of color during extrusion/molding.

The hindered phenol-based stabilizer is not particularly limited if it has an antioxidant function. Examples of the hindered phenol-based stabilizer include n-octadecyl-3-(4'-hydroxy-3',5'-di-t-butylphenol) propionate, tetrakis{methylene-3-(3',5'-di-t-butyl-4-hydroxyphenyl) propionate}methane, distearyl(4-hydroxy-3-methyl-5-t-butylbenzyl)malonate, triethylene glycol-bis{3-(3-t-butyl-5-methyl-4- hydroxyphenyl)propionate}, 1,6-hexanediol-bis{3-(3,5-di-t-butyl-4-hydroxyphenyl) propionate}, pentaerythrityl-tetrakis{3-(3,5-di-t-butyl-4-hydroxyphenyl) propionate}, 2,2-thiodiethylenebis{3-(3,5-di-t-butyl-4-hydroxyphenyl) propionate}, 2,2-thiobis(4-methyl-6-t-butylphenol), 1,3,5-trimethyl-2,4,6-tris(3,5-di-t-butyl-4-hydroxybenzyl)benzene, tris(3,5-di-t-butyl-4-hydroxybenzyl)-isocyanurate, 2,4-bis{(octylthio)methyl}-o-cresol, isooctyl-3-(3,5-di-t-butyl-4-hydroxyphenyl) propionate, 2,5,7,8-tetramethyl-2(4',8',12'-trimethyltridecyl) chroman-6-ol and 3,3',3",5,5',5"-hexa-t-butyl-a,a',a"-(mesitylene-2,4, 6-triyl)tri-p-cresol.

Out of these, n-octadecyl-3-(4'-hydroxy-3',5'-di-t-butylphenyl) propionate, pentaerythrityl-tetrakis{3-(3,5-di-t-butyl-4-hydroxyphenyl)propionate}, 3,3',3",5,5',5"-hexa-t-butyl-a,a',a"-(mesitylene-2,4, 6-triyl)tri-p-cresol and 2,2-thiodiethylenebis{3-(3,5-di-t-butyl-4-hydroxyphenyl) propionate} are preferred.

These hindered phenol-based stabilizers may be used alone or in combination of two or more.

The hindered phenol-based stabilizer is used in an amount of preferably 0.001 to 1 part by weight, more preferably 0.01 to 0.5 part by weight and much more preferably 0.01 to 0.3 part by weight based on 100 parts by weight of the polycarbonate resin.

The copolycarbonate of the present invention may be blended with a release agent as long as the object of the present invention is not impaired so as to further improve its releasability from a metal mold at the time of melt molding.

The release agent is selected from a higher fatty acid ester of a monohydric or polyhydric alcohol, higher fatty acid, paraffin wax, beeswax, olefin-based wax, olefin-based wax containing a carboxyl group and/or a carboxylic anhydride group, silicone oil and organopolysiloxane.

The higher fatty acid ester is preferably a partial ester or full ester of a monohydric or polyhydric alcohol having 1 to 20 carbon atoms and a saturated fatty acid having 10 to 30 carbon atoms. Examples of the partial ester or full ester of a monohydric or polyhydric alcohol and a saturated fatty acid include monoglyceride stearate, diglyceride stearate, triglyceride stearate, monosorbitate stearate, stearyl stearate, monoglyceride behenate, behenyl behenate, pentaerythritol monostearate, pentaerythritol tetrastearate, pentaerythritol tetrapelargonate, propylene glycol monostearate, stearyl stearate, palmityl palmitate, butyl stearate, methyl laurate, isopropyl palmitate, biphenyl biphenate, sorbitan monostearate and 2-ethylhexyl stearate. Out of these, monoglyceride stearate, triglyceride stearate, pentaerythritol tetrastearate and behenyl behenate are preferably used.

The higher fatty acid is preferably a saturated fatty acid having 10 to 30 carbon atoms. Examples of the fatty acid include myristic acid, lauric acid, palmitic acid, stearic acid and behenic acid.

These release agents may be used alone or in combination of two or more. The amount of the release agent is preferably 0.01 to 5 parts by weight based on 100 parts by weight of the polycarbonate resin.

The copolycarbonate of the present invention may be blended with an optical stabilizer as long as the object of the present invention is not impaired. Examples of the optical stabilizer include 2-(2'-hydroxy-5'-tert-octylphenyl)benzotriazole, 2-(3-tert-butyl-5-methyl-2-hydroxyphenyl)-5-chlorobenzotriazole, 2-(5-methyl-2-hydroxyphenyl)benzotriazole, 2-[2-hydroxy-3,5-bis($\alpha,\alpha$-dimethylbenzyl)phenyl]-2H-benzotriazole, 2,2'-methylenebis(4-cumyl-6-benzotriazolephenyl) and 2,2-'-p-phenylenebis(1,3-benzoxazin-4-one).

These optical stabilizers may be used alone or in combination of two or more. The amount of the optical stabilizer is preferably 0.01 to 2.0 parts by weight based on 100 parts by weight of the polycarbonate resin.

Also, the copolycarbonate of the present invention may be blended with a bluing agent to erase the yellow tinge of a lens based on a polymer or an ultraviolet absorbent. Any bluing agent may be used without trouble if it is used for polycarbonate resin compositions. Anthraquinone-based dyes are easily acquired and preferred.

Typical examples of the bluing agent include generic name Solvent Violet 13 [CA. No (color index No) 60725], generic name Solvent Violet 31 [CA. No. 68210], generic name Solvent Violet 33 [CA. No 60725], generic name Solvent Blue 94 [CA. No 61500], generic name Solvent Violet 36 [CA. No 68210], generic name Solvent Blue 97 [Macrolex Violet RR of Bayer AG]] and generic name Solvent Blue 45 [CA. No 61110].

These bluing agents may be used alone or in combination of two or more. The amount of the bluing agent is $0.1 \times 10^{-4}$ to $2 \times 10^{-4}$ part by weight based on 100 parts by weight of the polycarbonate resin.

The copolycarbonate of the present invention may be blended with a fluorescent dye or a dye to be used for transparent color molded articles as long as its transparency is not impaired.

The fluorescent dye is not particularly limited if it can be used for thermoplastic resins, as exemplified by xanthene-, thiazole-, thiazine-, perylene-, coumalin- and diaminostilbene-based fluorescent dyes. Out of these, perylene- and coumalin-based fluorescent dyes such as Lumogen Color of BASF, Fluorescent of Arimoto Chemical Co., Ltd. and the Macrolex of Bayer AG are easily acquired as commercial products and may be preferably used.

The amount of the fluorescent dye is 0.001 to 5 parts by weight and preferably 0.01 to 2 parts by weight based on 100 parts by weight of the total of it and the copolycarbonate. When the amount of the fluorescent dye is smaller than 0.001 part by weight, fluorescence is hardly obtained and when the amount is larger than 5 parts by weight, transparency degrades and discoloration becomes marked, whereby fluorescence of interest cannot be obtained.

The copolycarbonate of the present invention is blended with the above additives, for example, by means of a tumbler, twin-cylinder mixer, super mixer, Nauter mixer, Banbury mixer, kneading roll or extruder, or the above components are mixed together while they are dissolved in a common good solvent such as methylene chloride. The method for mixing these substances is not particularly limited, and any polymer blending method which is generally used may be employed.

Since the copolycarbonate of the present invention has excellent heat resistance, it can be used in a wide variety of fields such as optical parts including optical sheets, optical disks, information disks, optical lenses and prisms, and mechanical parts, construction materials, auto parts, resin trays and tableware. It is advantageously used for purposes which require transparency.

The copolycarbonate of the present invention may be mixed with a bio-based polymer or synthetic resin such as polylactic acid, aliphatic polyester, aromatic polyester, aromatic polycarbonate, polyamide, polystyrene, polyolefin, polyacryl, ABS or polyurethane, or rubber to be alloyed.

The present invention includes a method for reducing the saturation water absorption coefficient of the copolycarbonate by using the unit (C) constituted of at least one diol residue selected from the group consisting of aliphatic diol residue, alicyclic diol residue, oxylene glycol residue and diol residue having a cyclic ether structure as the comonomer of a copolycarbonate containing the unit (A) constituted of an ether diol residue represented by the formula (1) and the unit (B) constituted of a bisphenol residue represented by the formula (2).

As for the copolymerization ratio, preferably, the content of the unit (A) is 40 to 92 mol %, the content of the unit (B) is 5 to 57 mol %, and the content of the unit (C) is 3 to 55 mol % based on the total number of moles of the units (A), (B) and (C).

The ratio of the terminal groups of the copolycarbonate preferably falls within the ranges of the following expressions (i) and (ii).

(i) 0.001<total number of hydroxyl groups derived from the unit (A) and the unit (C)/total number of all terminal groups<0.3

(ii) 0.02<number of phenolic hydroxyl groups derived from the unit (B)/total number of all terminal groups<0.6

[In the above expressions, the total number of all terminal groups is the total number of the hydroxyl group of the ether diol, the phenolic hydroxyl group, the hydroxyl group of the aliphatic diol, the hydroxyl group of the alicyclic diol, the hydroxyl group of oxylene glycol, the hydroxyl group of the cyclic ether diol and all phenyl carbonate terminals.]

EXAMPLES

The following examples are provided for the purpose of further illustrating the present invention but are in no way to be taken as limiting. "Parts" in Examples means "parts by weight". Resins and evaluations methods used in Examples are as follows.

1. Specific Viscosity ($\eta_{sp}$)

A pellet was dissolved in methylene chloride to a concentration of about 0.7 g/dL so as to measure its specific viscosity with an Ostwald's viscometer (name of device: RIGO AUTO VISCOSIMETER TYPE VMR-0525·PC) at 20° C. The specific viscosity ($\eta_{sp}$) is obtained from the following equation.

$\eta_{sp} = t/t_0 - 1$ (t: flow time of a sample solution, $t_0$: flow time of a solvent alone)

2. Copolymerization Ratio

A deuterated chloroform solution of the copolycarbonate was prepared to measure its copolymerization ratio by using the JNM-AL400 proton NMR of JEOL Ltd.

3. Measurement of Tg (Glass Transition Temperature)

The glass transition temperature was measured in a nitrogen atmosphere at a temperature elevation rate of 20° C./min by using the 2910 DSC of TA Instruments Japan.

4. Measurement of Td (5% Weight Loss Temperature)

The 5% weight loss temperature was measured in a nitrogen atmosphere and an air atmosphere at a temperature elevation rate of 20° C./min (start temperature of 40° C.) by using the 2950 TGA of TA Instruments Japan.

5. Refractive Index

The formed film was used to measure its refractive index at 25° C. and a wavelength of 589 nm by using the DR-M2 Abbe's refractometer of Atago Co., Ltd.

6. Abbe's Number

The formed film was used to measure its refractive indices at 25° C. and wavelengths of 589 nm, 486 nm and 656 nm by using the DR-M2 Abbe's refractometer of Atago Co., Ltd. so as to calculate its Abbe's number ($v_d$) from the following equation.

$$v_d = (n_d - 1)/(n_f - n_c)$$

$v_d$: Abbe's number
$n_d$: refractive index for D line ($\lambda$=589 nm)
$n_f$: refractive index for F line ($\lambda$=486 nm)
$n_c$: refractive index for F line ($\lambda$=656 nm)

7. Melt Viscosity

The melt viscosity at 600 sec$^{-1}$ was read from a shear rate/viscosity curve obtained from measurement results by using the capillary rheometer of Toyoseiki Co., Ltd. (capilograph model 1D) and changing the measurement speed arbitrarily at a capillary length of 10.0 mm, a capillary diameter of 1.0 mm, and a measurement temperature of 240° C.

8. Saturation Water Absorption Coefficient

A molded triple plate which was dried at 100° C. for 24 hours was immersed in 23° C. water and taken out regularly to measure its weight so as to calculate its water absorption coefficient from the following equation. The saturation water absorption coefficient is a water absorption coefficient at the time when there is no weight increase by the water absorption of the above molded plate any more. Water absorption coefficient (%)=(mass of molded plate after water absorption–weight of molded plate before water absorption)/mass of molded plate before water absorption×100

9. Biogenic Matter Content (Plant Ratio)

The biogenic matter content was measured from a biogenic matter content test based on percent modern carbon (C14) in accordance with ASTM D6866 05.

10. Evaluation of Color (b Value) and Appearance of Molded Plate

The b value of a 2.00 mm-thick portion of a triple plate (arithmetic average surface roughness Ra: 0.03 µm) molded by the method described in Examples was measured by using the SE-2000 spectral color meter of Nippon Denshoku Industries Co., Ltd. (light source: C/2). The b value is derived from a Hunter color difference formula from tristimulus values X, Y and Z specified in JIS Z8722. As this value becomes smaller, the color becomes more achromic. It was visually checked whether there was a problem with appearance such as a silver streak.

11. Evaluation of Residence Stability

Figure 2:
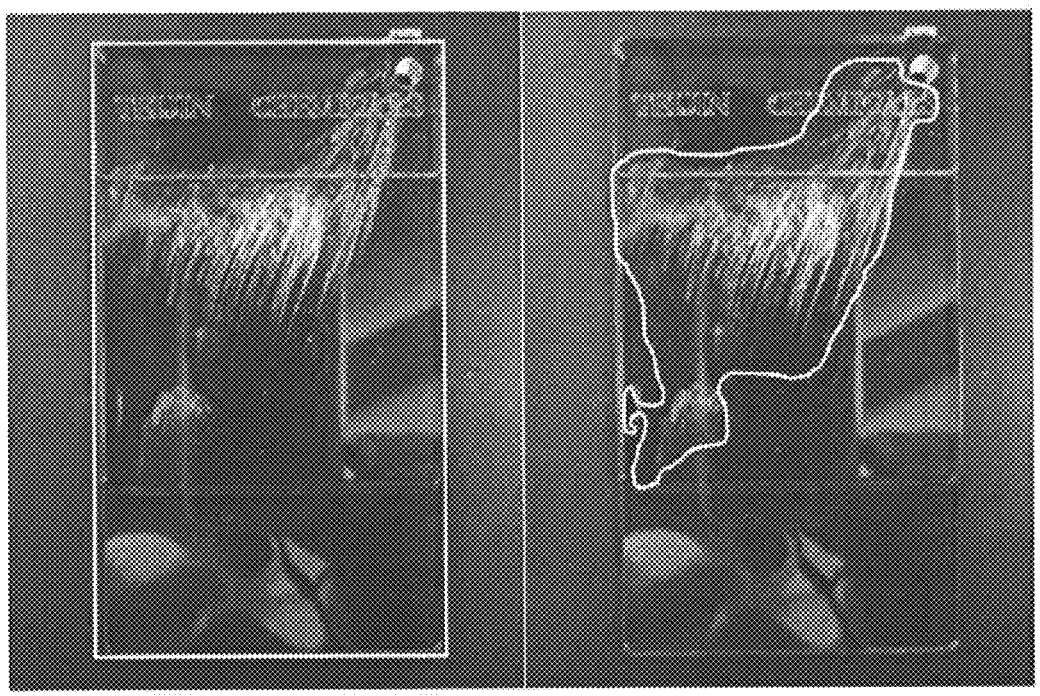
FIG. 2 is a diagram of evaluation results of residence stability of a copolycarbonate produced in Comparative Example 2 (left: total area of a triple plate, right: area of a silver streak production site).

The pellet was molded at a cylinder temperature of 240° C. and a mold temperature of 90° C. by using an injection molding machine [JSWJ-75EIII of The Nippon Steel Works, Ltd.] to obtain a triple plate (arithmetic average surface roughness; 0.03 µm). After 10 shots were continuously molded, the resin was retained in the cylinder of the injection molding machine for 10 minutes to mold a triple plate after residence. Since the melt viscosity was high only in Comparative Example 2, molding was carried out at a cylinder temperature of 260° C. After 10 minutes of residence, a photo of a triple plate of the second shot was taken and input into the Image J image analyzing software (Image J) to measure the area value of the whole triple plate and the area value of a silver streak production portion. An example of the photo is shown in FIG. 2. The incidence (%) of a silver streak was calculated from the following equation.

Incidence (%) of silver streak=area value of silver streak production portion/entire area value of triple plate×100

Example 1

(Heat Melting)

250.66 parts of isosorbide (to be abbreviated as ISS hereinafter), 274.18 parts of 2,2-bis(4-hydroxyphenyl)propane (to be abbreviated as BPA hereinafter), 60.84 parts of 1,6-hexanediol (to be abbreviated as HD hereinafter), 749.70 parts of diphenyl carbonate (to be abbreviated as DPC hereinafter), and 3.0×10$^{-2}$ part of tetramethylammonium hydroxide and 1.0×10$^{-4}$ part of sodium hydroxide as catalysts were heated at 170° C. in a nitrogen atmosphere to be molten.

(EI Reaction Step)

After it was confirmed that these substances were molten, an EI reaction step was started. After the start of depressurization, the pressure was reduced to a final level of 13.4 kPa over 70 minutes and maintained at that level after 13.4 kPa was reached. Concurrently with the start of depressurization, the temperature was raised at a rate of 10° C./hr until the final resin temperature became 190° C. After 190° C. was reached, the resin was maintained at a pressure of 13.4 kPa and a temperature of 190° C. for 10 minutes until 80% of the theoretical amount of the phenol was distilled off. It was confirmed that 80% of the theoretical amount of the phenol was distilled off.

(PA Reaction Step (Former Step))

Thereafter, a PA reaction step (former step) was started. The temperature was raised at a rate of 0.5° C./min until the final resin temperature became 220° C. Concurrently with this, the pressure was reduced over 60 minutes until the final pressure became 3 kPa.

(PA Reaction Step (Latter Step))

Subsequently, the PA reaction step (latter step) was started. In the latter step, the temperature was raised at a rate of 1° C./min until the final resin temperature became 240° C. Concurrently with this, the pressure was reduced over 20 minutes until the final pressure became 134 kPa. When a predetermined agitation power value was reached, the reaction was terminated, a tetrabutylphosphonium salt of dodecylbenzenesulfonic acid was added in an amount 2 times the molar amount of the catalyst to deactivate the catalyst, nitrogen was discharged from the bottom of a reaction tank under increased pressure, and the obtained product was cut by a pelletizer while cooled in a water tank to obtain a pellet.

The specific viscosity, glass transition temperature, 5% weight loss temperature and melt viscosity of the pellet were measured and shown in Tables 1 and 2. As shown in FIG. 1, the composition ratio was obtained from the integral ratio of a peak at 4.80 to 5.03 ppm derived from the recurring unit of ISS, a peak at 7.19 to 7.32 ppm derived from the recurring unit of BPA and a peak at 1.30 to 1.55 ppm derived from the recurring unit of HD. The terminal ratio was obtained from the integral ratio of a peak at 3.54 to 3.62 ppm derived from the OH terminal of ISS, a peak at 6.65 to 6.75 ppm derived from the OH terminal of BPA, a peak at 3.62 to 3.70 ppm derived from the OH terminal of HD and a peak at 7.35 to 7.45 ppm derived from the phenyl carbonate terminal.

(Molding of Film)

Then, a T die having a width of 150 mm and a lip width of 500 μm and a film take-up device were set in the 15φ double-screw extrusion kneader of Technovel Corporation to mold the obtained polycarbonate resin at 240° C. to obtain a transparent extruded film. A sample measuring 50 mm×10 mm was cut out from the obtained film to measure its refractive index and Abbe's number which are shown in Table 2.

(Molding of Plate)

100 parts of the pellet was uniformly mixed with 0.05 part of bis(2,6-di-tert-butyl-4-methylphenyl)pentaerythritol diphosphite (ADK STAB PEP-36 of ADEKA corporation), and the resulting mixture was injected into an extruder to produce a resin composition. A 15 mmφ vented double-screw extruder (KZW15-25MG of Technovel Corporation) was used as the extruder. The extrusion conditions were a discharge rate of 8.4 kg/h, a screw revolution of 250 rpm, a vent vacuum degree of 3 kPa, and an extrusion temperature from a first feed port to a dice portion of 240° C. Thus, a re-extruded pellet was obtained.

After the obtained re-extruded pellet was dried at 100° C. for 12 hours, a metal mold having a cavity surface with an arithmetic average roughness (Ra) of 0.03 μm and an injection molding machine [JSWJ-75EIII of the Japan Steel Works, Ltd.] were used to injection mold the pellet at a cylinder temperature of 240° C. and a mold temperature of 90° C. so as to obtain a triple plate having a width of 55 mm, a length of 90 mm and thicknesses from the gate side of 3 mm (length of 20 mm), 2 mm (length of 45 mm) and 1 mm (length of 25 mm) and evaluate the color, appearance, saturation water absorption coefficient and residence stability of the plate.

Example 2

The operation of Example 1 was repeated except that 315.83 parts of ISS, 242.85 parts of BPA, 24.34 parts of HD and 749.70 parts of DPC were used to measure the specific viscosity, glass transition temperature, 5% weight loss temperature and melt viscosity of the obtained pellet which are shown in Tables 1 and 2. The composition ratio and the terminal ratio were obtained in the same manner as in Example 1. A film was formed in the same manner as in Example 1 to measure its refractive index and Abbe's number which are shown in Table 2. A triple plate was injection molded in the same manner as in Example 1 to evaluate its color, appearance, saturation water absorption coefficient and residence stability.

Example 3

The operation of Example 1 was repeated except that 330.87 parts of ISS, 242.85 parts of BPA, 12.17 parts of HD and 749.70 parts of DPC were used to measure the specific viscosity, glass transition temperature, 5% weight loss temperature and melt viscosity of the obtained pellet which are shown in Tables 1 and 2. The composition ratio and the terminal ratio were obtained in the same manner as in Example 1. A film was formed in the same manner as in Example 1 to measure its refractive index and Abbe's number which are shown in Table 2. A triple plate was injection molded in the same manner as in Example 1 to evaluate its color, appearance, saturation water absorption coefficient and residence stability.

Example 4

The operation of Example 1 was repeated except that 280.74 parts of ISS, 266.35 parts of BPA, 52.73 parts of HD and 749.70 parts of DPC were used to measure the specific viscosity, glass transition temperature, 5% weight loss temperature and melt viscosity of the obtained pellet which are shown in Tables 1 and 2. The composition ratio and the terminal ratio were obtained in the same manner as in Example 1. A film was formed in the same manner as in Example 1 to measure its refractive index and Abbe's number which are shown in Table 2. A triple plate was injection molded in the same manner as in Example 1 to evaluate its color, appearance, saturation water absorption coefficient and residence stability.

Example 5

The operation of Example 1 was repeated except that 260.69 parts of ISS, 274.18 parts of BPA, 52.73 parts of HD and 749.70 parts of DPC were used to measure the specific viscosity, glass transition temperature, 5% weight loss temperature and melt viscosity of the obtained pellet which are shown in Tables 1 and 2. The composition ratio and the terminal ratio were obtained in the same manner as in Example 1. A film was formed in the same manner as in Example 1 to measure its refractive index and Abbe's number which are shown in Table 2. A triple plate was injection molded in the same manner as in Example 1 to evaluate its color, appearance, saturation water absorption coefficient and residence stability.

Example 6

The operation of Example 1 was repeated except that 260.69 parts of ISS, 274.18 parts of BPA, 49.48 parts of 1,4-cyclohexanedimethanol (to be abbreviated as CHDM hereinafter) and 749.70 parts of DPC were used to measure the specific viscosity, glass transition temperature, 5% weight loss temperature and melt viscosity of the obtained pellet which are shown in Tables 1 and 2. The composition ratio was obtained from the integral ratio of a peak at 4.80 to 5.03 ppm derived from the recurring unit of ISS, a peak at 7.19 to 7.32 ppm derived from the recurring unit of BPA and a peak at 0.90 to 1.20 ppm derived from the recurring unit of CHDM. The terminal ratio was obtained from the integral ratio of a peak at 3.54 to 3.62 ppm derived from the OH terminal of ISS, a peak at 6.65 to 6.75 ppm derived from the OH terminal of BPA, a peak at 3.29 to 3.63 ppm derived from the OH terminal of CHDM and a peak at 7.35 to 7.45 ppm derived from the phenyl carbonate terminal.

A film was formed in the same manner as in Example 1 to measure its refractive index and Abbe's number which are shown in Table 2. A triple plate was injection molded in the same manner as in Example 1 to evaluate its color, appearance, saturation water absorption coefficient and residence stability.

Example 7

<Production of Copolycarbonate Resin>
The operation of Example 1 was repeated except that 250.66 parts of ISS, 351.78 parts of 2,2-bis(4-hydroxy-3-methylphenyl)propane (to be abbreviated as BPC hereinafter), 40.56 parts of HD and 749.70 parts of DPC were used to measure the specific viscosity, glass transition temperature, 5% weight loss temperature and melt viscosity of the obtained pellet which are shown in Tables 1 and 2. The composition ratio and the terminal ratio were obtained in the same manner as in Example 1.

A film was formed in the same manner as in Example 1 to measure its refractive index and Abbe's number which are shown in Table 2. A triple plate was injection molded in the same manner as in Example 1 to evaluate its color, appearance, saturation water absorption coefficient and residence stability.

Example 8

<Production of Copolycarbonate Resin>
The operation of Example 1 was repeated except that 300.79 parts of ISS, 263.84 parts of BPC, 40.56 parts of HD and 749.70 parts of DPC were used to measure the specific viscosity, glass transition temperature, 5% weight loss temperature and melt viscosity of the obtained pellet which are shown in Tables 1 and 2. The composition ratio and the terminal ratio were obtained in the same manner as in Example 1.

A film was formed in the same manner as in Example 1 to measure its refractive index and Abbe's number which are shown in Table 2. A triple plate was injection molded in the same manner as in Example 1 to evaluate its color, appearance, saturation water absorption coefficient and residence stability.

Comparative Example 1

The operation of Example 1 was repeated except that 375.99 parts of ISS, 101.40 parts of HD and 749.70 parts of DPC were used to measure the specific viscosity, glass transition temperature, 5% weight loss temperature and melt viscosity of the obtained pellet which are shown in Tables 1 and 2. The composition ratio was obtained from the integral ratio of a peak at 4.80 to 5.03 ppm derived from the recurring unit of ISS and a peak at 1.30 to 1.55 ppm derived from the recurring unit of HD. The terminal ratio was obtained from the integral ratio of a peak at 3.54 to 3.62 ppm derived from the OH terminal of ISS, a peak at 3.62 to 3.70 ppm derived from the OH terminal of HD and a peak at 7.35 to 7.45 ppm derived from the phenyl carbonate terminal.

A film was formed in the same manner as in Example 1 to measure its refractive index and Abbe's number which are shown in Table 2. A triple plate was injection molded in the same manner as in Example 1 to evaluate its color, appearance, saturation water absorption coefficient and residence stability.

Comparative Example 2

The operation of Example 1 was repeated except that 471.24 parts of ISS, 39.17 parts of BPA, 4.06 parts of HD and 749.70 parts of DPC were used and the final reaction temperature was changed to 250° C. to measure the specific viscosity, glass transition temperature, 5% weight loss temperature and melt viscosity of the obtained pellet which are shown in Tables 1 and 2. The terminal ratio was obtained from the integral ratio of a peak at 3.54 to 3.62 ppm derived from the OH terminal of ISS, a peak at 6.65 to 6.75 ppm derived from the OH terminal of BPA, a peak at 3.62 to 3.70 ppm derived from the OH terminal of HD and a peak at 7.35 to 7.45 ppm derived from the phenyl carbonate terminal.

A film was formed in the same manner as in Example 1 except that the film was molded at 260° C. to measure its refractive index and Abbe's number which are shown in Table 2. A triple plate was injection molded in the same manner as in Example 1 except that the extrusion temperature and the molding temperature were set to 260° C. to evaluate its color, appearance, saturation water absorption coefficient and residence stability.

Comparative Example 3

The operation of Example 1 was repeated except that 340.90 parts of ISS, 158.34 parts of CHDM and 749.70 parts of DPC were used to measure the specific viscosity, glass transition temperature, 5% weight loss temperature and melt viscosity of the obtained pellet which are shown in Tables 1 and 2. The composition ratio was obtained from the integral ratio of a peak at 4.80 to 5.03 ppm derived from the recurring unit of ISS and a peak at 0.90 to 1.20 ppm derived from the recurring unit of CHDM. The terminal ratio was obtained from the integral ratio of a peak at 3.54 to 3.62 ppm derived from the OH terminal of ISS, a peak at 3.29 to 3.63 ppm derived from the OH terminal of CHDM and a peak at 7.35 to 7.45 ppm derived from the phenyl carbonate terminal.

A film was formed in the same manner as in Example 1 to measure its refractive index and Abbe's number which are shown in Table 2. A triple plate was injection molded in the same manner as in Example 1 to evaluate its color, appearance, saturation water absorption coefficient and residence stability.

Comparative Example 4

The operation of Example 1 was repeated except that 250.66 parts of ISS, 454.57 parts of 9,9-bis(4-hydroxy-3-methylphenyl)fluorene (to be abbreviated as BCF hereinafter), 60.84 parts of HD and 749.70 parts of DPC were used to measure the specific viscosity, glass transition temperature, 5% weight loss temperature and melt viscosity of the obtained pellet which are shown in Tables 1 and 2. The composition ratio was obtained from the integral ratio of a peak at 4.80 to 5.03 ppm derived from the recurring unit of ISS, a peak at 7.69 to 7.84 ppm derived from the recurring unit of BCF and a peak at 1.30 to 1.55 ppm derived from the recurring unit of HD. The terminal ratio was obtained from the integral ratio of a peak at 3.54 to 3.62 ppm derived from the OH terminal of ISS, a peak at 6.57 to 6.63 ppm derived from the OH terminal of BCF, a peak at 3.62 to 3.70 ppm derived from the OH terminal of HD and a peak at 7.35 to 7.45 ppm derived from the phenyl carbonate terminal.

A film was formed in the same manner as in Example 1 to measure its refractive index and Abbe's number which are shown in Table 2. A triple plate was injection molded in the same manner as in Example 1 to evaluate its color, appearance, saturation water absorption coefficient and residence stability.

Comparative Example 5

330.87 parts of ISS, 242.85 parts of BPA, 12.17 parts of HD, 720.30 parts of DPC, and $3.0 \times 10^{-2}$ part of tetramethylammonium hydroxide and $1.0 \times 10^{-4}$ part of sodium hydroxide as catalysts were heated at 170° C. in a nitrogen atmosphere to be molten. After it was confirmed that these substances were molten, an EI reaction step was started. After the start of depressurization, the pressure was reduced to a final level of 50 kPa over 50 minutes and maintained at that level after 50 kPa was reached. Concurrently with the start of depressurization, the temperature was raised at a rate of 20° C./hr until the final resin temperature became 230° C.

After the final resin temperature reached 230° C., a PA reaction step (former step) was started. Depressurization was carried out over 90 minutes to achieve a final pressure level of 3 kPa. Subsequently, the PA reaction step (latter step) was started. In the latter step, the temperature was raised at a rate of 1° C./min so that the final resin temperature became 240° C. Concurrently with this, the pressure was reduced to a final level of 134 kPa over 20 minutes. When a predetermined agitation power value was reached, the reaction was terminated, a tetrabutylphosphonium salt of dodecylbenzenesulfonic acid was added in an amount 2 times the molar amount of the catalyst to deactivate the catalyst, nitrogen was discharged from the bottom of a reaction tank under increased pressure, and the obtained product was cut by a pelletizer while cooled in a water tank to obtain a pellet. The specific viscosity, glass transition temperature, 5% weight loss temperature and melt viscosity of the pellet were measured and shown in Tables 1 and 2. The composition ratio and the terminal ratio were obtained in the same manner as in Example 1.

A film was formed in the same manner as in Example 1 to measure its refractive index and Abbe's number which are shown in Table 2. A triple plate was injection molded in the same manner as in Example 1 to evaluate its color, appearance, saturation water absorption coefficient and residence stability.

Since the final resin temperature and the final vacuum degree in the EI reaction step were high in Comparative Example 5, the value of total number of hydroxyl groups derived from the unit A and the unit (C)/total number of all terminal groups represented by the expression (i) became large, and the value of number of phenolic hydroxyl groups/total number of all terminal groups represented by the expression (ii) became large.

Comparative Example 6

250.66 parts of ISS, 274.18 parts of BPA, 60.84 parts of HD, 749.70 parts of DPC, and $3.0 \times 10^{-2}$ part of tetramethylammonium hydroxide and $1.0 \times 10^{-4}$ part of sodium hydroxide as catalysts were heated at 170° C. in a nitrogen atmosphere to be molten. After it was confirmed that these substances were molten, an EI reaction step was started. After the start of depressurization, the pressure was reduced to a final level of 6 kPa over 70 minutes and maintained at that level after 6 kPa was reached. Concurrently with the start of depressurization, the temperature was raised at a rate of 15° C./hr until the final resin temperature became 190° C. After the final resin temperature reached 190° C., a PA reaction step (former step) was started. The temperature was raised at a rate of 0.5° C./min so that the final resin temperature became 220° C. Concurrently with this, the pressure was reduced to a final level of 3 kPa over 60 minutes. Subsequently, the PA reaction step (latter step) was started. In the latter step, the temperature was raised at a rate of 1° C./min so that the final resin temperature became 240° C. Concurrently with this, depressurization was carried out over 20 minutes until the final pressure became 134 Pa. Thereafter, since the agitation power value did not rise even by maintaining a resin temperature of 240° C. and a pressure level of 134 Pa, nitrogen was discharged from the bottom of a reaction tank under increased pressure to obtain a resin mass. The specific viscosity, composition ratio and terminal ratio of the resin mass were obtained in the same manner as in Example 1. Since HD was distilled off to the outside of the system during polymerization, the molar balance of the terminal ratio was lost, and the molecular weight did not increase.

In Comparative Example 6, since the final vacuum degree was too low in the EI reaction step, the value of number of phenolic hydroxyl groups derived from the unit (B)/total number of all terminal groups represented by the expression (ii) became small.

TABLE 1

| | Charge ratio (mol %) | | | | | Reaction conditions | | | | | |
| | Unit (A) | Unit (B) | | | Unit (C) | | EI reaction step | PA reaction step (former step) | | PA reaction step (latter step) | |
| | ISS | BPA | BCF | BPC | HD | CHDM | Final resin temperature (° C.) | Final pressure (kPa) | Final resin temperature (° C.) | Final pressure (kPa) | Final resin temperature (° C.) | Final pressure (kPa) |
|---|---|---|---|---|---|---|---|---|---|---|---|---|
| Ex. 1 | 50 | 35 | — | — | 15 | — | 190 | 13.4 | 220 | 3 | 240 | 134 |
| Ex. 2 | 63 | 31 | — | — | 6 | — | 190 | 13.4 | 220 | 3 | 240 | 134 |
| Ex. 3 | 66 | 31 | — | — | 3 | — | 190 | 13.4 | 220 | 3 | 240 | 134 |
| Ex. 4 | 56 | 34 | — | — | 10 | — | 190 | 13.4 | 220 | 3 | 240 | 134 |
| Ex. 5 | 52 | 35 | — | — | 13 | — | 190 | 13.4 | 220 | 3 | 240 | 134 |
| Ex. 6 | 50 | 35 | — | — | — | 15 | 190 | 13.4 | 220 | 3 | 240 | 134 |
| Ex. 7 | 50 | — | — | 40 | 10 | — | 190 | 13.4 | 220 | 3 | 240 | 134 |
| Ex. 8 | 60 | — | — | 30 | 10 | — | 190 | 13.4 | 220 | 3 | 240 | 134 |
| C. Ex. 1 | 75 | — | — | — | 25 | — | 190 | 13.4 | 220 | 3 | 240 | 134 |
| C. Ex. 2 | 94 | 5 | — | — | 1 | — | 190 | 13.4 | 220 | 3 | 240 | 134 |
| C. Ex. 3 | 68 | — | — | — | — | 32 | 190 | 13.4 | 220 | 3 | 240 | 134 |
| C. Ex. 4 | 50 | — | 35 | — | 15 | — | 190 | 13.4 | 220 | 3 | 240 | 134 |
| C. Ex. 5 | 66 | 31 | — | — | 3 | — | 230 | 50 | 230 | 3 | 240 | 134 |
| C. Ex. 6 | 50 | 35 | — | — | 15 | — | 190 | 6 | 220 | 3 | 240 | 134 |

TABLE 1-continued

|  | Actual composition ratio (mol %) | | | | | Terminal ratio | | All phenyl carbonate terminals | Specific viscosity | plant ratio (%) |
|  | Unit (A) | Unit (B) | | | Unit (C) | | Total number of hydroxyl groups of ether diol and aliphatic diol or alicyclic diol/total number of all terminal groups | Number of phenolic hydroxyl groups/total number of all terminal groups | | | |
|  | ISS | BPA | BCF | BPC | HD | CHDM | | | | | |
|---|---|---|---|---|---|---|---|---|---|---|---|
| Ex. 1 | 50.4 | 35.1 | — | — | 14.5 | — | 0.014 | 0.359 | 0.627 | 0.35 | 30 |
| Ex. 2 | 61.0 | 33.3 | — | — | 5.6 | — | 0.115 | 0.389 | 0.496 | 0.26 | 39 |
| Ex. 3 | 63.8 | 32.9 | — | — | 3.3 | — | 0.085 | 0.467 | 0.448 | 0.29 | 40 |
| Ex. 4 | 55.9 | 34.6 | — | — | 9.4 | — | 0.029 | 0.278 | 0.693 | 0.27 | 33 |
| Ex. 5 | 51.6 | 36.2 | — | — | 12.2 | — | 0.006 | 0.234 | 0.760 | 0.30 | 31 |
| Ex. 6 | 49.9 | 35.5 | — | — | — | 14.6 | 0.009 | 0.353 | 0.638 | 0.30 | 29 |
| Ex. 7 | 50.1 | — | — | 40.5 | 9.4 | — | 0.011 | 0.364 | 0.625 | 0.37 | 27 |
| Ex. 8 | 59.8 | — | — | 31.2 | 9.0 | — | 0.032 | 0.341 | 0.627 | 0.35 | 36 |
| C. Ex. 1 | 76.0 | — | — | — | 24.0 | — | 0.398 | — | 0.602 | 0.34 | 64 |
| C. Ex. 2 | 94.1 | 5.1 | — | — | 0.8 | — | 0.211 | 0.074 | 0.715 | 0.34 | 76 |
| C. Ex. 3 | 69.6 | — | — | — | — | 31.4 | 0.420 | — | 0.580 | 0.32 | 53 |
| C. Ex. 4 | 50.2 | — | 35.4 | — | 14.4 | — | 0.025 | 0.392 | 0.583 | 0.32 | 21 |
| C. Ex. 5 | 65.6 | 31.3 | — | — | 3.1 | — | 0.310 | 0.623 | 0.067 | 0.25 | 40 |
| C. Ex. 6 | 50.9 | 36.2 | — | — | 12.9 | — | 0.002 | 0.017 | 0.981 | 0.19 | 30 |

Ex.: Example C. Ex.: Comparative Example

TABLE 2

|  | Tg(° C.) | Td(° C.) air atmosphere | Td(° C.) nitrogen atmosphere | refractive index | Abbe's number | saturation water absorption coefficient (%) | melt viscosity (Pa · s) |
|---|---|---|---|---|---|---|---|
| Ex. 1 | 122 | 351 | 357 | 1.530 | 47 | 1.08 | 548 |
| Ex. 2 | 140 | 358 | 362 | 1.539 | 39 | 1.64 | 373 |
| Ex. 3 | 148 | 357 | 359 | 1.539 | 43 | 1.81 | 605 |
| Ex. 4 | 127 | 357 | 362 | 1.542 | 42 | 1.32 | 291 |
| Ex. 5 | 121 | 357 | 361 | 1.540 | 41 | 1.16 | 331 |
| Ex. 6 | 136 | 360 | 362 | 1.530 | 47 | 1.20 | 598 |
| Ex. 7 | 120 | 352 | 356 | 1.532 | 46 | 1.02 | 631 |
| Ex. 8 | 124 | 354 | 358 | 1.528 | 49 | 1.23 | 567 |
| C. Ex. 1 | 97 | 332 | 350 | 1.499 | 64 | 2.16 | 347 |
| C. Ex. 2 | 160 | 355 | 358 | 1.512 | 55 | 4.13 | 1128 |
| C. Ex. 3 | 118 | 348 | 350 | 1.501 | 61 | 2.16 | 515 |
| C. Ex. 4 | 156 | 360 | 361 | 1.540 | 43 | 1.39 | 787 |
| C. Ex. 5 | 147 | 357 | 359 | 1.539 | 43 | 2.03 | 603 |

Ex.: Example C. Ex.: Comparative Example

TABLE 3

|  | Molding conditions | | Evaluation of molded plate | | Evaluation of residence stability Incidence of silver streak (%) |
|  | Cylinder temperature ° C. | Mold temperature ° C. | Color (b value) | Appearance | |
|---|---|---|---|---|---|
| Ex. 1 | 240 | 90 | 1.9 | Satisfactory | 0 |
| Ex. 2 | 240 | 90 | 2.3 | Satisfactory | 7 |
| Ex. 3 | 240 | 90 | 2.4 | Satisfactory | 3 |
| Ex. 4 | 240 | 90 | 2.1 | Satisfactory | 2 |
| Ex. 5 | 240 | 90 | 2.1 | Satisfactory | 0 |
| Ex. 6 | 240 | 90 | 2.0 | Satisfactory | 0 |
| Ex. 7 | 240 | 90 | 4.1 | Satisfactory | 6 |
| Ex. 8 | 240 | 90 | 3.8 | Satisfactory | 4 |
| C. Ex. 1 | 240 | 90 | 2.7 | Satisfactory | 27 |
| C. Ex. 2 | 260 | 90 | 10.7 | Silver streak produced | 35 |
| C. Ex. 3 | 240 | 90 | 2.5 | Satisfactory | 24 |
| C. Ex. 4 | 240 | 90 | 15.0 | Satisfactory | 1 |
| C. Ex. 5 | 240 | 90 | 7.8 | Satisfactory | 23 |

Ex.: Example C. Ex.: Comparative Example

EFFECT OF THE INVENTION

The copolycarbonate and transparent molded article obtained therefrom of the present invention have an advantage that they are derived from a renewable resource. Further, the copolycarbonate and transparent molded article obtained therefrom of the present invention are excellent in heat resistance, flowability and transparency and rarely experience a dimensional change by water absorption as well as coloration and the production of a silver streak during molding.

INDUSTRIAL APPLICABILITY

Since the copolycarbonate of the present invention has excellent heat resistance, it can be used in a wide variety of fields such as optical parts such as optical sheets, optical disks, information disks, optical lenses and prisms, and mechanical parts, construction materials, auto parts, resin trays and tableware. It is particularly advantageously used for purposes which require transparency.

The invention claimed is:

1. A copolycarbonate comprising a unit (A) constituted of an ether diol residue represented by the following formula (1), a unit (B) constituted of a bisphenol residue represented by the following formula (2), and a unit (C) constituted of another diol residue, wherein
  (I) the unit (C) is at least one diol residue selected from the group consisting of aliphatic diol residue, alicyclic diol residue, oxylene glycol residue and diol residue having a cyclic ether structure,
    wherein the aliphatic diol residue is at least one diol residue selected from the group consisting of ethylenediol residue, 1,3-propanediol residue, 1,4-butanediol residue, 1,5-pentanediol residue, 1,6-hexanediol residue, 1,8-octanediol residue and 1,10-decanediol residue,
    wherein the alicyclic diol residue is at least one diol residue selected from the group consisting of cyclohexanedimethanol residue, tricyclodecanedimethanol residue, pentacyclopentadecanedimethanol residue and adamantanedimethanol residue,
    wherein the oxylene glycol residue is at least one diol residue selected from the group consisting of diethylene glycol, triethylene glycol, tetraethylene glycol and polyethylene glycol, and
    wherein the diol residue having a cyclic ether structure is at least one diol residue selected from the group consisting of spiroglycol and dioxane glycol;
  (II) the content of the unit (A) is 40 to 92 mol %, the content of the unit (B) is 5 to 57 mol %, and the content of the unit (C) is 3 to 55 mol % based on the total number of moles of the units (A), (B) and (C); and
  (III) the ratio of terminal groups falls within the ranges of the following expressions (i) and (ii):
    (i) 0.001<total number of hydroxyl groups derived from the unit (A) and the unit (C)/total number of all terminal groups <0.2
    (ii) 0.02<the number of phenolic hydroxyl groups derived from the unit (B)/total number of all terminal groups <0.6,
  wherein, in the above expressions, the total number of all terminal groups is the total number of the hydroxyl group of the ether diol, the phenolic hydroxyl group, the hydroxyl group of the aliphatic diol, the hydroxyl group of the alicyclic diol, the hydroxyl group of oxylene glycol, the hydroxyl group of the cyclic ether diol and all phenyl carbonate terminals,

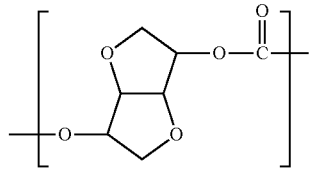

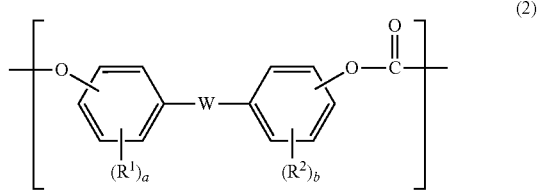

wherein, in the above formula (2), $R^1$ and $R^2$ are each independently at least one group selected from the group consisting of hydrogen atom, halogen atom, alkyl group having 1 to 10 carbon atoms, alkoxy group having 1 to 10 carbon atoms, cycloalkyl group having 6 to 20 carbon atoms, cycloalkoxy group having 6 to 20 carbon atoms, alkenyl group having 2 to 10 carbon atoms, aryl group having 6 to 10 carbon atoms, aryloxy group having 6 to 10 carbon atoms, aralkyl group having 7 to 20 carbon atoms, aralkyloxy group having 7 to 20 carbon atoms, nitro group, aldehyde group, cyano group and carboxyl group, when there are two or more $R^1$'s and $R^2$'s, they may be the same or different, "a" and "b" are each an integer of 1 to 4, and W is at least one bond selected from the group consisting of a single bond and bonds represented by the following formulas (3):

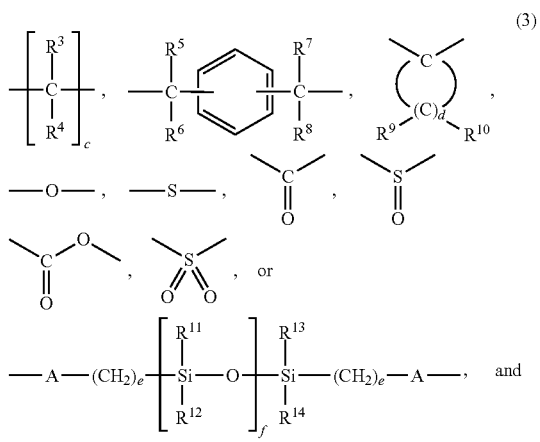

wherein, in the above formulas (3), $R^3$, $R^4$, $R^5$, $R^6$, $R^7$, $R^8$, $R^9$ and $R^{10}$ are each independently at least one group selected from the group consisting of hydrogen atom, alkyl group having 1 to 10 carbon atoms, aryl group having 6 to 10 carbon atoms and aralkyl group having 7 to 20 carbon atoms, when there are two or more $R^3$'s, $R^4$'s, $R^5$'s, $R^6$'s, $R^7$'s, $R^8$'s, $R^9$'s and $R^{10}$'s, they may be the same or different, $R^{11}$, $R^{12}$, $R^{13}$ and $R^{14}$ are each independently at least one group selected from the group consisting of alkyl group having 1 to 10 carbon atoms, cycloalkyl group having 6 to 20 carbon atoms, alkenyl group having 2 to 10 carbon atoms, aryl group having 6 to 10 carbon atoms and aralkyl group having 7 to 20 carbon atoms, when there are two or more $R^{11}$'s, $R^{12}$'s, $R^{13}$'s and $R^{14}$'s, they may be the same or different, "c" is an integer of 1 to 10, "d" is an integer of 4 to 7, "e" is an integer of 1 to 3, and "f" is an integer of 1 to 100.

2. The copolycarbonate according to claim 1, wherein the unit (A) represented by the above formula (1) is represented by the following formula (4)

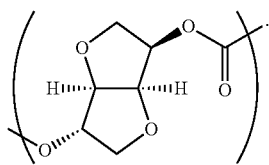

(4)

3. The copolycarbonate according to claim 1, wherein the number of carbon atoms of the bisphenol constituting the unit (B) is 24 or less.

4. The copolycarbonate according to claim 1, wherein the unit (B) represented by the above formula (2) is at least one diol residue selected from the group consisting of α,α'-bis(4-hydroxyphenyl)-m-diisopropylbenzene residue, 1,1-bis(4-hydroxyphenyl)cyclohexane residue, 1,1-bis(4-hydroxyphenyl)-3,3,5-trimethylcyclohexane residue, 3,3'-dimethyl-4,4'-dihydroxydiphenyl sulfide residue, 2,2-bis(4-hydroxyphenyl)propane residue, 2,2-bis(4-hydroxy-3-methylphenyl)propane residue, 2,2-bis(4-hydroxyphenyl)-1,1,1,3,3,3-hexafluoropropane residue and 1,1-bis(4-hydroxyphenyl)decane residue.

5. The copolycarbonate according to claim 1 which has a glass transition temperature (Tg) of 90 to 160° C.

6. The copolycarbonate according to claim 1 which has a melt viscosity measured by a capillary rheometer at 240° C. of $1.10 \times 10^3$ Pa·s or less at a shear rate of 608 sec$^{-1}$.

7. The copolycarbonate according to claim 1 which has a saturation water absorption coefficient of 3.5% or less.

8. The copolycarbonate according to claim 1 which has a refractive index of 1.50 to 1.58 and an Abbe's number of 36 to 64.

9. The copolycarbonate according to claim 1, wherein the content of the unit (A) is 40 to 85 mol %, the content of the unit (B) is 10 to 55 mol %, and the content of the unit (C) is 5 to 50 mol % based on the total number of moles of the units (A), (B) and (C).

10. The copolycarbonate according to claim 1, wherein the content of the unit (A) is 45 to 80 mol %, the content of the unit (B) is 15 to 50 mol %, and the content of the unit (C) is 5 to 40 mol % based on the total number of moles of the units (A), (B) and (C).

11. A transparent molded article comprising the copolycarbonate of claim 1.

* * * * *